(12) United States Patent
Koezuka

(10) Patent No.: US 9,398,623 B2
(45) Date of Patent: Jul. 19, 2016

(54) COMMUNICATION TERMINAL, WIRELESS DEVICE, PROVIDER SERVER, AND WIRELESS COMMUNICATION SYSTEM

(75) Inventor: Shinji Koezuka, Hamamatsu (JP)

(73) Assignee: Yamaha Corporation, Hamamatsu-shi (JP)

(*) Notice: Subject to any disclaimer, the term of this patent is extended or adjusted under 35 U.S.C. 154(b) by 517 days.

(21) Appl. No.: 13/824,532

(22) PCT Filed: Sep. 20, 2011

(86) PCT No.: PCT/JP2011/071383
§ 371 (c)(1),
(2), (4) Date: Mar. 18, 2013

(87) PCT Pub. No.: WO2012/043305
PCT Pub. Date: Apr. 5, 2012

(65) Prior Publication Data
US 2013/0176984 A1      Jul. 11, 2013

(30) Foreign Application Priority Data

Sep. 27, 2010   (JP) .................................. 2010-215705
Jun. 23, 2011   (JP) .................................. 2011-139647

(51) Int. Cl.
*H04B 7/00*      (2006.01)
*H04W 76/02*     (2009.01)
(Continued)

(52) U.S. Cl.
CPC .............. *H04W 76/02* (2013.01); *H04B 11/00* (2013.01); *H04W 48/10* (2013.01); *H04L 63/068* (2013.01); *H04W 12/04* (2013.01)

(58) Field of Classification Search
CPC ...................... H04L 2012/5608; H04W 84/12; H04W 88/08; H04W 80/04; H04W 88/06; H04W 84/18; H04W 8/26

USPC ................................ 370/310.2, 328, 349, 338
See application file for complete search history.

(56) References Cited

U.S. PATENT DOCUMENTS 7,742,602 B2    6/2010   Ishidoshiro et al.
8,184,602 B2 *  5/2012   Aaltonen et al. .............. 370/338
(Continued)

FOREIGN PATENT DOCUMENTS

CN      1645827 A       7/2005
JP      2005051625 A    2/2005
(Continued)

OTHER PUBLICATIONS

Notice of Submission of Opinion issued by the Korean Patent Office in application No. 10-2013-7007582, mail date, Aug. 29, 2014. English translation provided.

(Continued)

*Primary Examiner* — Brenda H Pham
(74) *Attorney, Agent, or Firm* — Rossi, Kimms & McDowell LLP

(57) ABSTRACT

A wireless access point superimposes establishment information used for establishing a wireless communication channel between a communication terminal and the own device on a sound signal, and emits a sound wave corresponding to the sound signal to a speaker. The communication terminal acquires the sound signal representing the sound wave detected by a microphone, and extracts the establishment information from the acquired sound signal. The communication terminal transmits the extracted establishment information to the wireless access point to establish the wireless communication channel between the communication terminal and the wireless access point, and conducts a communication through the established wireless communication channel.

11 Claims, 11 Drawing Sheets

(51) Int. Cl.
*H04B 11/00* (2006.01)
*H04W 48/10* (2009.01)
*H04L 29/06* (2006.01)
*H04W 12/04* (2009.01)

(56) References Cited

U.S. PATENT DOCUMENTS

| | | | | |
|---|---|---|---|---|
| 8,749,584 | B2* | 6/2014 | Jung et al. | 345/633 |
| 8,818,273 | B2* | 8/2014 | Jung | H04B 11/00 455/41.2 |
| 2005/0050318 | A1 | 3/2005 | Alone et al. | |
| 2005/0132193 | A1 | 6/2005 | Ishidoshiro et al. | |
| 2005/0255886 | A1 | 11/2005 | Aaltonen et al. | |
| 2010/0110837 | A1 | 5/2010 | Jung et al. | |
| 2011/0245945 | A1* | 10/2011 | Iwase et al. | 700/94 |

FOREIGN PATENT DOCUMENTS

| | | |
|---|---|---|
| JP | 2005175524 A | 6/2005 |
| JP | 2007074180 A | 3/2007 |
| JP | 2007110274 A | 4/2007 |

OTHER PUBLICATIONS

Japanese Office Action issued in Japanese Appln. No. JP2011-139647 dated Dec. 16, 2014. English translation provided.
International Search Report for PCT/JP2011/071383, dated Oct. 25, 2011 (Form PCT/ISA/210). English translation provided.
PCT/ISA/237 Form for PCT/JP2011/071383, dated Oct. 11, 2011.
Notification of the First Office Action issued in Chinese Patent application No. 201180046064 dated Feb. 17, 2015. English translation provided. JP200774180 and US20050050318.
Extended European Search Report issued in European Application No. 11828862.0 mailed Apr. 22, 2016.

* cited by examiner

FIG.12
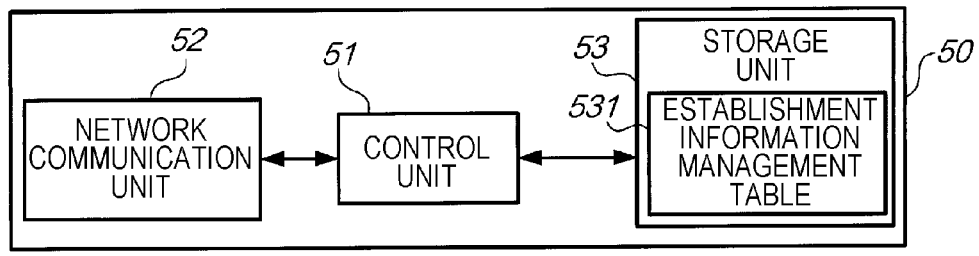
FIG.13
| MANAGEMENT NUMBER | ESTABLISHMENT INFORMATION |
|---|---|
| No.001 | est001 |
| No.002 | est002 |
| No.003 | est003 |
| No.004 | est004 |
| No.005 | est005 |
| ... | ... |
531
FIG.14
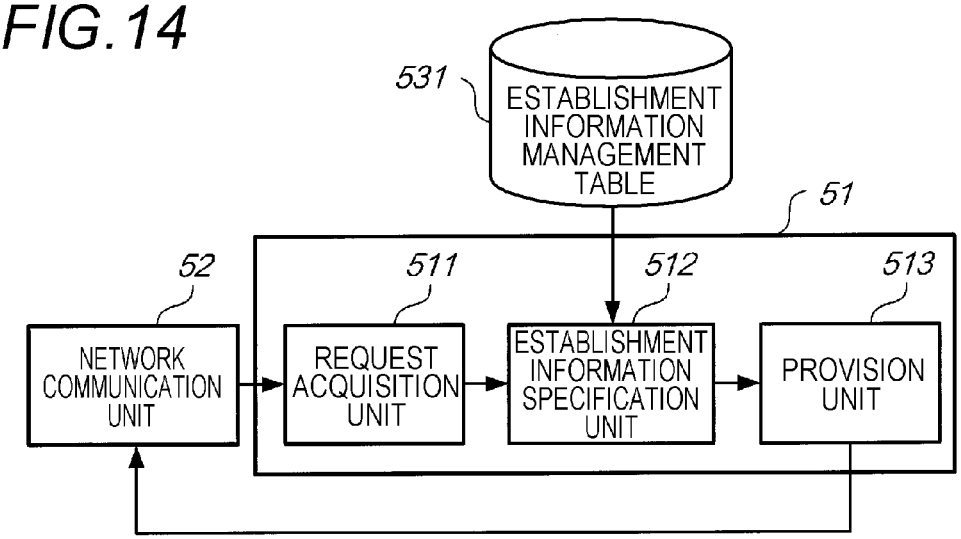

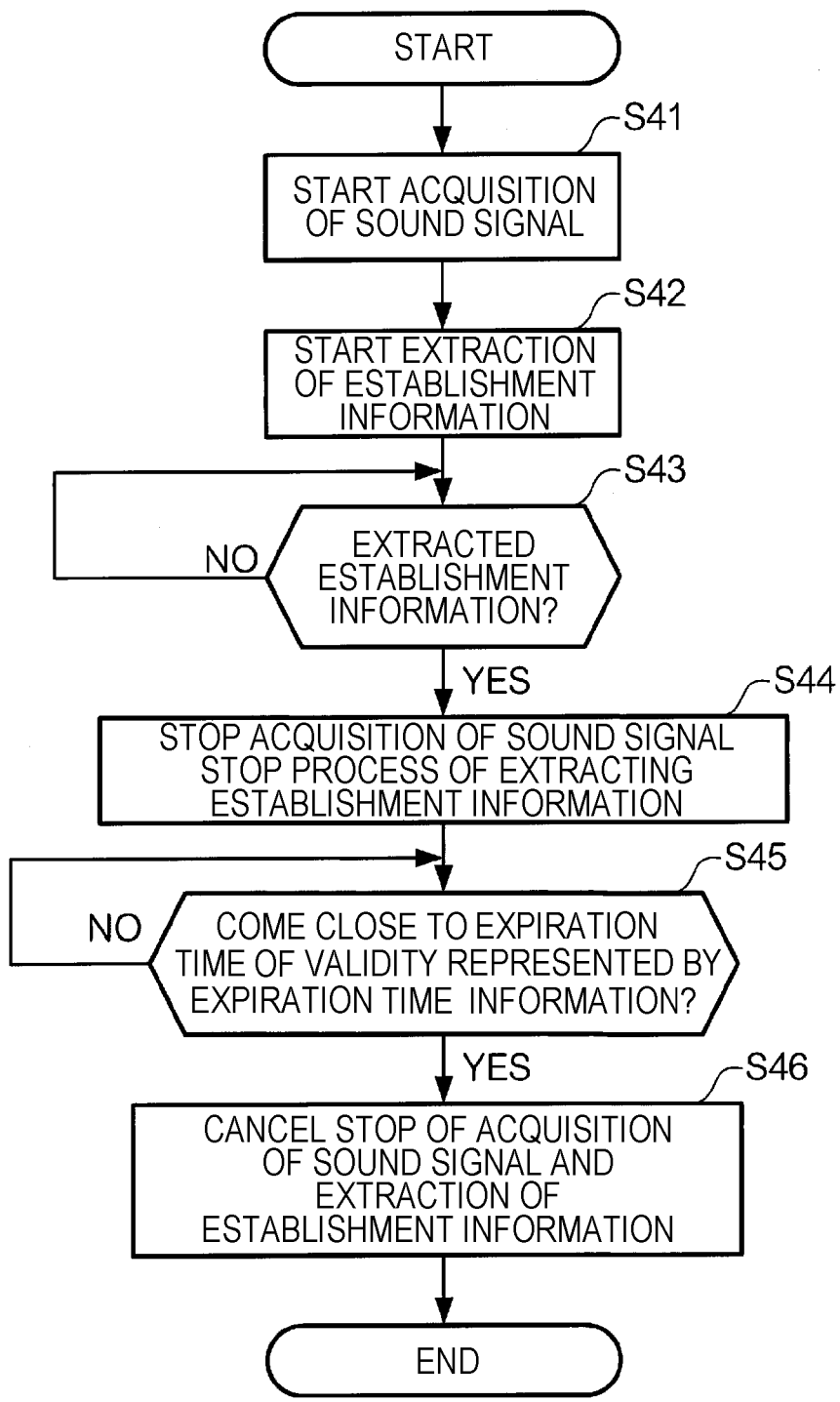

COMMUNICATION TERMINAL, WIRELESS DEVICE, PROVIDER SERVER, AND WIRELESS COMMUNICATION SYSTEM

TECHNICAL FIELD

The present invention relates to a wireless communication.

BACKGROUND ART

A service has been known which is called "public wireless LAN" that enables an internet connection using a wireless LAN (local area network) with the use of a communication terminal brought by a user in restaurants or stations. In this connection service, an electric wave of the wireless LAN is leaked out of an area to which the service is to be provided, and the service may be utilized by an unintended user. For example, Patent Literature 1 discloses that, in order to restrict an area to which configuration information is distributed, an access point blinks an infrared LED light emitting unit, and a digital camera of a communication device picks up the blinked light emitting unit, whereby the communication device obtains the configuration information necessary for connection to the access point.

CITATION LIST

Patent Literature

Patent Literature 1: JP-A-2007-110274

SUMMARY OF INVENTION

Technical Problem

An object of the present invention is to restrict a communicable range in an area where an electric wave used for a wireless communication arrives.

Solution to Problem

In order to achieve the above object, a communication terminal according to an aspect of the present invention includes: a wireless communication unit; an acquisition unit that is adapted to acquire a sound signal representing a sound wave; an extraction unit that is adapted to extract information from the sound signal acquired by the acquisition unit, wherein the information defines establishment information used for establishing a wireless communication channel between the communication terminal and a wireless device; and a communication control unit that is adapted to transmit the establishment information which is defined by the information extracted by the extraction unit through the wireless communication to establish the wireless communication channel, and to control the wireless communication unit to conduct a communication through the established wireless communication channel.

The communication terminal according to the invention may be configured by further including a generation unit that is adapted to perform predetermined processing on the extracted information to generate the establishment information defined by the extracted information, wherein the communication control unit establishes the wireless communication channel with use of the establishment information generated by the generation unit.

The communication terminal according to the invention may be configured so that the wireless communication unit communicates with a provider server that is adapted to provide the establishment information through a wireless communication network, the communication control unit requests the provider server to transmit the establishment information defined by the extracted information to the communication terminal through the wireless communication unit, and upon receiving the establishment information provided by the provider server through the wireless communication unit in response to the request, the communication control unit establishes the wireless communication channel with use of the received establishment information.

The communication terminal according to the invention may be configured so that after the communication control unit establishes the wireless communication channel with the use of the establishment information defined by the extracted information, the extraction unit stops extracting the information which defines the establishment information, and thereafter cancels to stop extracting at a timing corresponding to an expiration time of validity of the establishment information represented by expiration time information included in the extracted information.

The communication terminal according to the invention may be configured so that after the communication control unit establishes the wireless communication channel, also the acquisition unit stops acquisition of the sound signal, and thereafter cancels to stop the acquisition at the timing.

A wireless device according to another aspect of the present invention includes: a wireless communication unit; a superimposition unit that is adapted to superimpose information on a sound signal, wherein the information defines establishment information used for establishing a wireless communication channel between the wireless device and a communication terminal; a sound emission control unit that is adapted to control a sound emission unit to emit a sound wave according to the sound signal on which the information defining the establishment information is superimposed by the superimposition unit; and a communication control unit that is adapted to establish the wireless communication channel with use of the establishment information acquired from the communication terminal through the wireless communication unit, wherein the establishment information is defined by information extracted by the communication terminal from the sound signal representing the sound wave emitted by the sound emission unit, wherein the communication control unit controls the wireless communication unit to conduct a communication through the established wireless communication channel.

In a preferred aspect of the wireless device according to the invention, it may be configured so that the sound emission unit includes a member that is adapted to vibrate, and a sound exciter that is adapted to excite the member, and the sound emission control unit excites the sound exciter so as to emit from the member the sound wave corresponding to the sound signal on which the information defining the establishment information is superimposed.

A provider server according to another aspect of the present invention includes: a network communication unit that is adapted to communicate through a wireless communication network with a communication terminal that includes: a wireless communication unit; an acquisition unit that is adapted to acquire a sound signal representing a sound wave; an extraction unit that is adapted to extract information from the sound signal acquired by the acquisition unit, wherein the information defines establishment information used for establishing a wireless communication channel between the communication terminal and a wireless device; and a communication control unit that is adapted to transmit the establishment information which is defined by the information extracted by the extraction unit through the wireless communication to establish the wireless communication channel, and to control the wireless communication unit to conduct a communication through the established wireless communication channel, wherein the communication control unit requests the provider server to transmit the establishment information defined by the extracted information to the communication terminal through the wireless communication unit, and upon receiving the establishment information provided by the provider server through the wireless communication unit in response to the request, the communication control unit establishes the wireless communication channel with use of the received establishment information; a storage unit that is adapted to store the establishment information and the information defining the establishment information in association with each other; and a provision unit that is adapted to transmit, upon receiving the transmission request through the network communication unit, the establishment information stored in the storage unit in association with the extracted information through the network communication unit, and to provide the establishment information to the communication terminal.

In the invention, it may be configured so that the storage unit stores plural pairs of the establishment information and the information defining the establishment information therein, and the provision unit provides the establishment information in the storage unit, paired with the information extracted by the extraction unit, to the communication terminal.

A provider server according to another aspect of the present invention includes: a network communication unit that is adapted to communicate, through a wireless communication network, a transmission request for establishment information including information by a communication terminal that is adapted to extract the information defining the establishment information used for establishing a wireless communication channel between the communication terminal and a wireless device, from a sound signal representing a sound wave; a storage unit that is adapted to store the establishment information and the information defining the establishment information in association with each other; and a provision unit that is adapted to transmit, upon receiving the transmission request through the network communication unit, the establishment information stored in the storage unit in association with the extracted information through the network communication unit, and to provide the establishment information to the communication terminal.

A wireless communication system according to the present invention includes the wireless device according to the invention and the provider server according to the invention, and the storage unit stores plural pairs of the establishment information and the information defining the establishment information therein, and the superimposition unit superimposes the information defining the establishment information included in one of the pair stored in the storage unit, on the sound signal.

A wireless communication system according to the present invention includes the wireless device according to the invention and the provider server according to the invention.

Advantageous Effects of Invention

According to the present invention, a communicable range in an area where an electric wave used for a wireless communication arrives can be restricted.

BRIEF DESCRIPTION OF DRAWINGS

FIG. 12 is a block diagram illustrating a configuration of a provider server.
FIG. 13 is a diagram illustrating a configuration of an establishment information management table.
FIG. 14 is a functional block diagram illustrating a functional configuration of a control unit of a provider server.
FIG. 21 is a flowchart illustrating a flow of processing in a communication terminal of a modified example 5.

DESCRIPTION OF EMBODIMENTS

Hereinafter, embodiments of the present invention will be described with reference to the drawings.

First Embodiment

Figure 1:
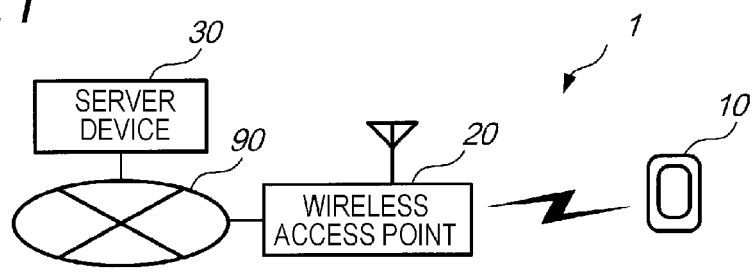
FIG. 1 is a diagram illustrating an outline configuration of a wireless communication system.

First, a first embodiment of the present invention will be described.
FIG. 1 is a diagram illustrating an outline configuration of a wireless communication system 1.
The wireless communication system 1 is to provide a connection service to a network using a wireless LAN, for example, within a certain restaurant.
The wireless communication system 1 includes a communication terminal 10, a wireless access point 20, and a server device 30. The communication terminal 10 is, for example, a smart phone which is a mobile communication terminal that is connected to the wireless access point 20 by a wireless communication conforming to IEEE 802.11. The wireless access point 20 is a wireless device called also "wireless LAN access point". The wireless access point 20 conducts a wireless communication with the communication terminal 10, and also is connected to a communication network 90 to conduct a network communication. That is, the communication terminal 10 is connected to the communication network 90 through the wireless access point 20, and mutually communicates with the respective devices connected to the communication network 90. The server device 30 is connected to the wireless access point 20 through the communication network 90, and provides, for example, a variety of contents to the communication terminal 10 through the wireless access point 20.

FIG. 1 illustrates only one wireless access point 20 included in the wireless communication system 1. However, a plurality of wireless access points 20 may be present therein. Also, the communication network 90 may be not a single communication network, but a plurality of communication networks different in communication system which is mutually connected.

Figure 2:
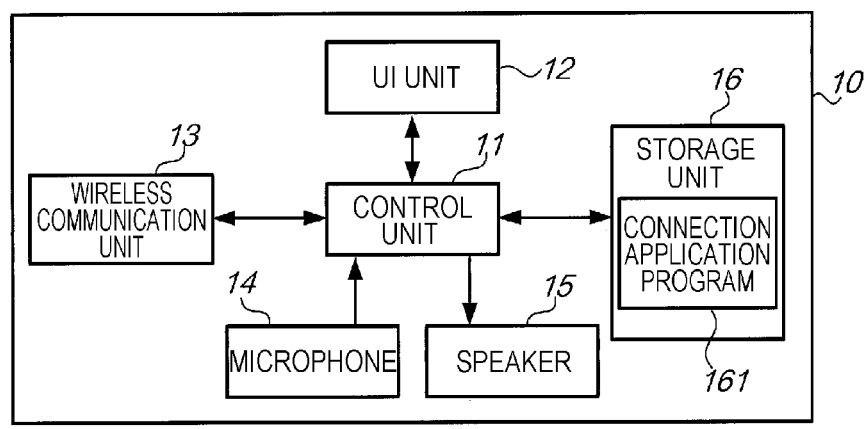
FIG. 2 is a block diagram illustrating a configuration of a communication terminal.

FIG. 2 is a block diagram illustrating a configuration of the communication terminal 10. As illustrated in FIG. 2, the communication terminal 10 includes a control unit 11, a UI (user interface) unit 12, a wireless communication unit 13, a microphone 14, a speaker 15, and a storage unit 16.

The control unit 11 is a control device having an arithmetic device including a CPU (central processing unit), a memory, and a timer. The arithmetic device executes a program stored in the memory or the storage unit 16 to control the communication terminal 10. The timer includes, for example, a real time clock, and a timing function. The UI unit 12 includes, for example, a touch panel, receives operation from a user, and also informs information with the help of an image or a sound. The wireless communication unit 13 is an interface having a wireless communication circuit and an antenna for connection to the wireless access point 20. Specifically, the wireless communication unit 13 establishes a wireless communication channel (that is, wireless link) with the wireless access point 20 as a communication partner, and conducts a wireless communication with the wireless access point 20 through the established wireless communication channel. The wireless communication unit 13 is an example of a wireless communication unit of the present invention, and conducts a wireless communication with the communication partner within a range where an electric wave for conducting the wireless communication arrives. The microphone 14 is a pickup unit that is connected by the communication terminal 10, and corresponds to a detection unit for detecting a sound wave. The microphone 14 detects the sound wave such as a received sound at a position of the communication terminal 10, and outputs a sound signal representing the detected sound wave to the control unit 11. The sound signal is, for example, a waveform signal of an analog format representing a sound waveform. The sound signal of the analog format is sampled in the control unit 11, and converted into a sound signal of a digital format. The speaker 15 emits a transmission sound.

The storage unit 16 includes, for example, an EEPROM (electronically erasable and programmable ROM), and stores a variety of programs used by the control unit 11. The programs include a connection application program 161 used for allowing the communication terminal 10 to be connected to the wireless access point 20 as well as an application program that is executed by the control unit 11 to require a connection to the communication network 90. The application program is to download music from a browser or a music delivery server, or related to a game enabling intercommunication with a terminal of another user.

Figure 3:
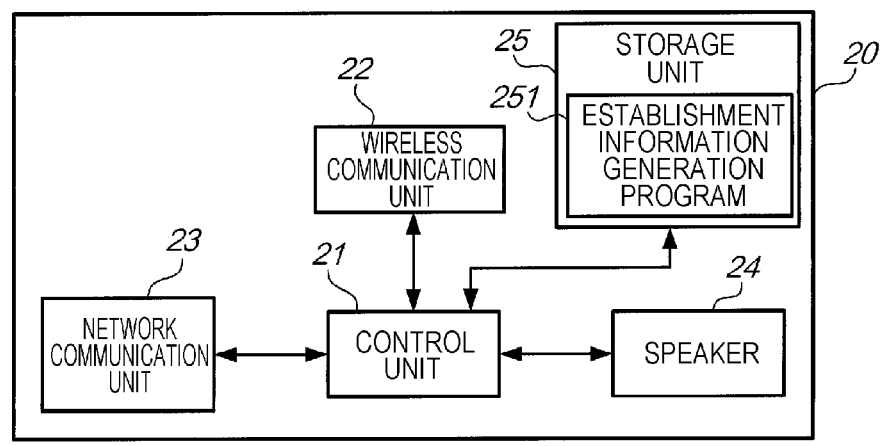
FIG. 3 is a block diagram illustrating a configuration of a wireless access point.

FIG. 3 is a block diagram illustrating a configuration of the wireless access point 20. As illustrated in FIG. 3, the wireless access point 20 includes a control unit 21, a wireless communication unit 22, a network communication unit 23, a speaker 24, and a storage unit 25.

The control unit 21 is a control device having an arithmetic device including a CPU, a memory, and a timer. The arithmetic device executes a program stored in the memory to control the wireless access point 20. The timer includes, for example, a real time clock, and has a timing function. The wireless communication unit 22 is an interface having a wireless communication circuit and an antenna for connection to the communication terminal 10. The wireless communication unit 22 establishes a wireless communication channel with the communication terminal 10 as a communication partner, and conducts a wireless communication with the communication terminal 10 through the established wireless communication channel. The network communication unit 23 is an interface for connection to the communication network 90. The speaker 24 functions as a sound emission unit that emits a sound wave according to the sound signal supplied from the control unit 21. The storage unit 25 includes, for example, a hard disk, and stores a program for operating the control unit 21, and an establishment information generation program 251 for generating establishment information which is information necessary for establishing the wireless communication channel therein.

The establishment information is information necessary for establishing a wireless communication channel between the communication terminal 10 and the wireless access point 20. That is, only the communication terminal 10 that has acquired the establishment information from the wireless access point 20 can receive the supply of a connection service using the communication network 90. The establishment information specifically includes an SSID (service set identifier), an encryption key conforming to WEP (wired equivalent privacy), and expiration time information representing an expiration time of validity of the encryption key. The SSID is an identifier of the wireless access point 20 in the wireless LAN of the wireless communication system conforming to IEEE 802.11. The SSID is used for avoiding the occurrence of an interference state that enables communications with a plurality of the wireless access points 20. The WEP is a secret key cryptosystem based on an RC4 algorithm, and applied as a security system of IEEE 802.11. The expiration time information represents the expiration time of validity of the encryption key. In this embodiment, the encryption key is information that is changed in contents according to a clock time, and updated at given periods (for example, every 30 minutes).

In this example, in the wireless communication system 1, the conformity of the cryptosystem which is the WEP is described within the connection application program 161 or within the establishment information generation program 251 in advance, and both of the communication terminal 10 and the wireless access point 20 can recognize the cryptosystem according to this description. Alternatively, the establishment information may include information representing the cryptosystem which is the WEP, and there is no description related to any cryptosystem to be conformed in the connection application program 161 and the establishment information generation program 251.

The wireless access point 20 has a function of delivering the establishment information to the communication terminal 10 situated within an area (hereinafter referred to as "communicable area") that enables the wireless communication with the own device. In this example, the communicable area is intended to be formed in a room space of a store, and not to include a space outside of the store. In this case, only the communication terminal 10 situated within the communicable area can acquire the establishment information, and establish the wireless communication channel to the wireless access point 20 with the use of the acquired establishment information. That is, the establishment information is used to control a range of the communicable area.

Figure 4:
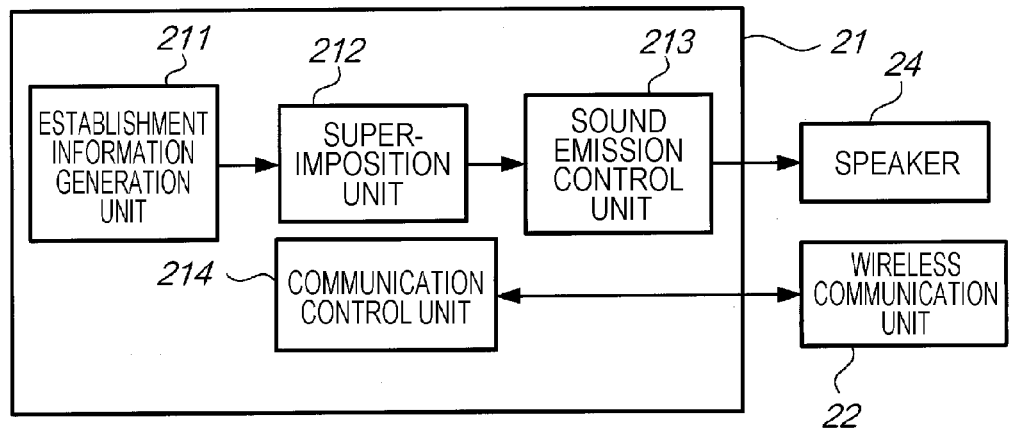
FIG. 4 is a functional block diagram illustrating a functional configuration of a control unit of a wireless access point.

FIG. 4 is a functional block diagram illustrating a functional configuration of the control unit 21 of the wireless access point 20. As illustrated in FIG. 4, the control unit 21 executes a variety of programs to realize functions corresponding to an establishment information generation unit 211, a superimposition unit 212, a sound emission control unit 213, and a communication control unit 214.

The establishment information generation unit 211 reads the establishment information generation program 251, and generates the establishment information according to an algorithm described within the establishment information generation program 251. In this example, the establishment information is represented by a bit string which is expressed by encoding the contents represented by the establishment information and using a value of "0" or "1". The establishment information generation unit 211 specifies the contents of the SSID, the encryption key, and the expiration time information, and generates the establishment information representing the contents.

The superimposition unit 212 superimposes information for defining the establishment information on the sound signal. In this example, the superimposition unit 212 superimposes the establishment information generated by the establishment information generation unit 211 on the sound signal. The superimposition of the establishment information can be realized by using a technique of so-called "audio watermarking". For example, the superimposition unit 212 uses an M-sequence which is a pseudorandom number code string having a given cyclic period, or a Gold-sequence as a spread code, and multiplies the spread code by the establishment information. This processing is also called "spread processing", and the spread code is modulated in phase at the cyclic periods according to a value of the establishment information, and a frequency spectrum of the establishment information is spread. The sound signal on which the establishment information is superimposed is not particularly restricted in the present invention. However, for example, the sound signal represents a BGM (background music) that is played within the store. The above-mentioned superimposition unit 212 is an example of a superimposition unit of the present invention.

The superimposition unit 212 superimposes the establishment information, for example, on a bandwidth higher than a frequency component of the sound signal so as to lessen an influence on a sound emission corresponding to the sound signal.

Figure 5:
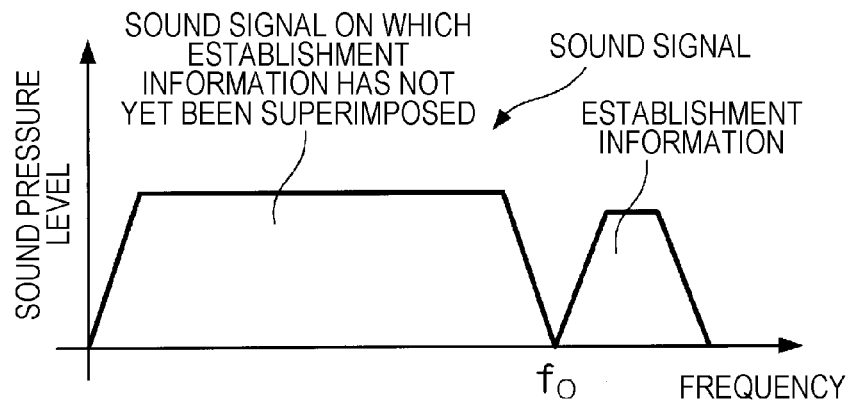
FIG. 5 is a diagram schematically illustrating a structure of a sound signal on which establishment information is superimposed.

FIG. 5 is a diagram schematically illustrating a structure of a sound signal on which the establishment information is superimposed.

In a graph illustrated in FIG. 5, the axis of abscissa corresponds to a frequency f, and the axis of ordinate corresponds to a sound pressure level. As illustrated in FIG. 5, in the sound signal on which the establishment information is superimposed, a frequency band lower than a frequency $f_0$ includes a frequency component of the sound which corresponds to the sound signal on which the establishment information has not yet been superimposed, and is intended to be listened in by a person, and a frequency band higher than the frequency $f_0$ includes a frequency component of the establishment information. The sound signal has the frequency component, for example, in an audible range (about 20 Hz to 20 kHz), and ensures the bandwidth on which the establishment information is superimposed in a bandwidth higher than the audible range. It is preferable that the frequency $f_0$ is equal to or higher than the vicinity of a higher frequency limit of the audible range such as 18.5 kHz or higher. In this case, in the sound emission corresponding to the sound signal on which the establishment information is superimposed, a sound corresponding to the establishment information can be hardly listened in by human's ears, and the establishment information does not substantially damage an acoustic quality. This makes it possible to suppress an adverse influence on audibility. When the establishment information that is superimposed on outside of an audible range cannot be maintained by the characteristics of an encoder at the time of compressing the sound signal, or the characteristics of an A/D converter used for A(analog)/D(digital) conversion, the establishment information may be superimposed on a relatively high frequency bandwidth within the audible range such as 15 kHz or higher. That is, it is not limited to a specific bandwidth in the present invention as to which frequency bandwidth the establishment information is superimposed on. Also, in the sound signal, the sound pressure levels of the frequency component corresponding to the sound intended to be listened in by the human and the frequency component corresponding to the establishment information may not have a specific relationship so far as the establishment information can be extracted from the sound signal.

The sound emission control unit 213 outputs the sound signal on which establishment information is superimposed by the superimposition unit 212 to the speaker 24, and allows the speaker 24 to emit the sound according to the sound signal. As a result, the sound including the frequency component corresponding to the establishment information is emitted from the speaker 24. That is, the communicable area is so formed as to substantially match a space region where the sound from the speaker 24 arrives. That is, the sound emission control unit 213 is an example of a sound emission control unit of the present invention.

The communication control unit 214 establishes the wireless communication channel between the communication terminal 10 and the wireless access point 20 with the use of the establishment information acquired from the communication terminal 10 by the wireless communication unit 22. The establishment information acquired from the communication terminal 10 by the communication control unit 214 is establishment information extracted by the sound emission control unit 213 from the sound signal representing a sound wave emitted by the sound emission control unit 213. Then, the communication control unit 214 controls the wireless communication unit 22 so as to communicate with the communication terminal 10 through the established wireless communication channel. For example, the communication control unit 214 conducts an authentication of whether the communication terminal 10 is allowed as the communication partner, or not. That is, the communication control unit 214 is an example of a communication control unit of the present invention.

Figure 6:
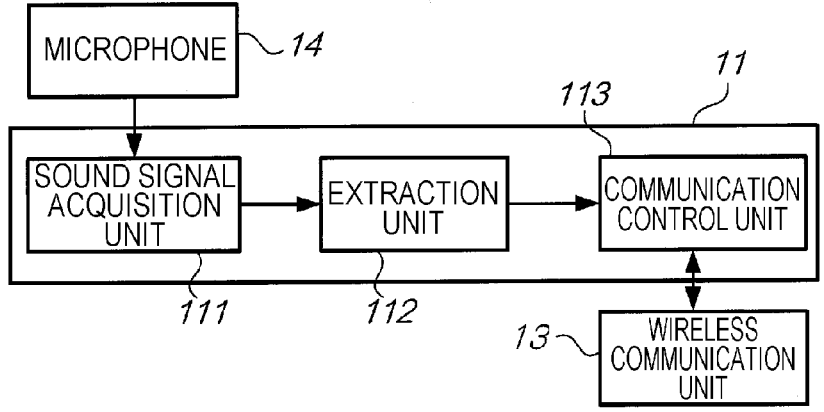
FIG. 6 is a functional block diagram illustrating a functional configuration of a control unit of a communication terminal.

FIG. 6 is a functional block diagram illustrating a functional configuration of the control unit 11 of a communication terminal 10. As illustrated in FIG. 6, the control unit 11 executes the connection application program 161 to realize functions corresponding to a sound signal acquisition unit 111, an extraction unit 112, and a communication control unit 113.

The sound signal acquisition unit 111 acquires the sound signal representing the sound wave picked up (detected) by the microphone 14. When the communication terminal 10 is situated within the communicable area, the sound including the frequency component corresponding to the establishment information, which is emitted from the speaker 24, is picked up by the microphone 14. That is, the sound signal acquisition unit 111 can acquire the sound signal including the frequency component of the establishment information.

The sound signal acquisition unit 111 is an example of an acquisition unit of the present invention.

The extraction unit 112 extracts the establishment information that is superimposed on the sound signal, as information that defines the establishment information from the sound signal acquired by the sound signal acquisition unit 111. The extraction unit 112 includes an HPF (high pass filter) having a cutoff frequency as $f_0$. The extraction unit 112 conducts filtering processing using the HPF to extract the frequency component corresponding to the establishment information. Then, the extraction unit 112 generates the same spread code as that used in the superimposition unit 212 to obtain a correlation between the spread signal and the sound signal. If the correlation between the sound signal and the spread code is obtained when a signal very high in autocorrelation is used as the spread code, a waveform exhibiting a precipitous peak is extracted. The waveform corresponds to the establishment information that is superimposed on the sound signal, and the extraction unit 112 decodes and extracts the establishment information from the waveform. As a result, the extraction unit 112 acquires three pieces of information including the SSID, the encryption key, and the expiration time information from the wireless access point 20 through the sound signal. That is, the extraction unit 112 is an example of an extraction unit of the present invention.

The communication control unit 113 transmits the establishment information, which is extracted by the extraction unit 112, with the aid of the wireless communication unit 13, and establishes the wireless communication channel between the communication terminal 10 and the wireless access point 20. Then, the communication control unit 113 controls the wireless communication unit 13 so as to communicate with the wireless access point 20 through the established wireless communication channel. That is, the communication control unit 113 is an example of a communication control unit of the present invention.

Strictly speaking, the communication terminal 10 can conduct the wireless communication with the wireless access point 20 at a place where the sound emitted from the speaker 24 arrives according to the sound signal, and the electric wave of the wireless LAN, which is emitted from the wireless communication unit 22 of the wireless access point 20, is propagated. In general, the electric wave used for a communication such as the wireless LAN is difficult to block more than the sound wave. Hence, in this embodiment, it is assumed that the electric wave of the wireless LAN is propagated through a place at which sound arrive according to at least the sound signal.

Figure 7:
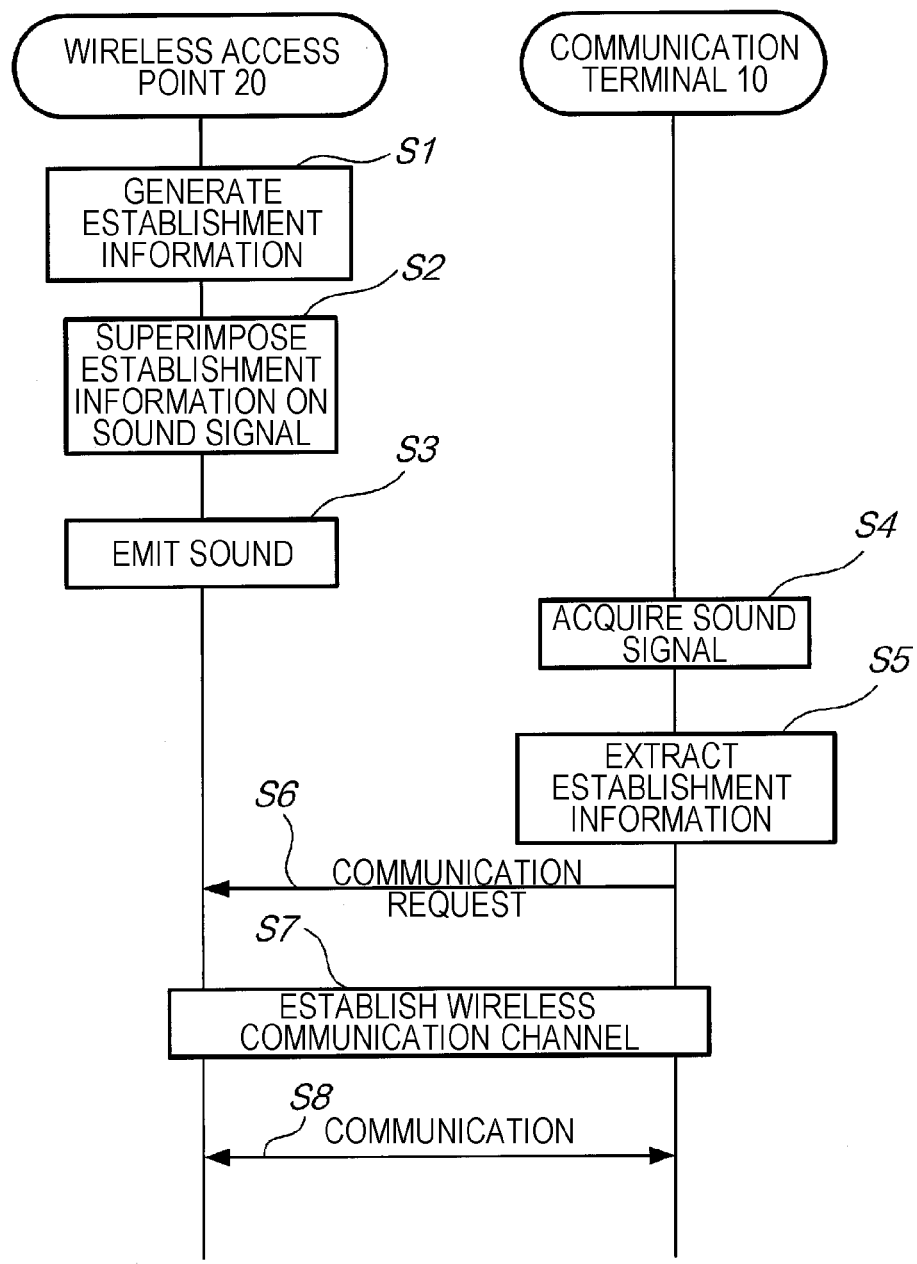
FIG. 7 is a sequence chart illustrating a flow of processing in the wireless communication system.

FIG. 7 is a sequence chart illustrating a flow of processing in the wireless communication system 1.

The control unit 21 of the wireless access point 20 executes the establishment information generation program 251, and generates the establishment information including the SSID, the encryption key, and the expiration time information (Step S1). Then, the control unit 21 reads the sound signal representing a music which is reproduced within, for example, the store from the storage unit 25, and superimposes the establishment information on the read sound signal (Step S2). Then, the control unit 21 outputs the sound signal on which the establishment information is superimposed from the speaker 24 as the sound wave, and allows the speaker 24 to emit the sound according to the sound signal (Step S3).

The control unit 11 of the communication terminal 10 executes the connection application program 161 in advance. During execution of the connection application program 161, the microphone 14 picks up (detects) the sound wave, and the control unit 11 acquires the sound signal representing the sound wave (Step S4). Then, the control unit 11 extracts the establishment information from the acquired sound signal (Step S5). Then, the control unit 11 transmits a communication request including the encryption key and the SSID, which are included in the extracted establishment information, to the wireless access point 20 by the wireless communication unit 13 (Step S6).

The control unit 11 continuously acquires the sound signal from the microphone 14 during execution of the connection application program 161.

Upon receiving the communication request from the communication terminal 10 by the wireless communication unit 22, the control unit 21 of the wireless access point 20 authenticates a validity thereof. In this example, the control unit 21 allows the wireless communication with the communication terminal 10 that is a source only if the control unit 21 authenticates that both of the SSID and the encryption key are valid. The control unit 11 of the communication terminal 10 conducts the wireless communication with the wireless access point 20 which is a source only if the allowance is acquired from the wireless access point 20. Upon receiving the allowance, the control unit 11 establishes the wireless communication channel between the wireless communication unit 22 of the wireless access point 20 and the communication terminal 10 by the wireless communication unit 13 (Step S7). Then, the communication terminal 10 and the wireless access point 20 mutually conduct the wireless communication through the wireless communication channel established in the processing of Step S7 (Step S8).

In processing of Step S8, the control unit 11 of the communication terminal 10 downloads the content from the communication network 90 through the wireless access point 20, transmits or receives data related to the game, or conducts a variety of wireless communications. Also, the control unit 21 of the wireless access point 20 receives the content corresponding to the wireless access point 20 from the server device 30 by the network communication unit 23, and delivers the received content to the communication terminal 10 by the wireless communication unit 22. For example, the wireless access point 20 provides the content such as an advertisement of a store or a coupon configured by the wireless communication system 1 to the communication terminal 10. The content is, for example, contents associated with a place where the wireless communication system 1 is configured.

In the wireless communication system 1, since the sound including the frequency component corresponding to the establishment information is continuously emitted from the speaker 24, whenever the user of the communication terminal 10 enters the communicable area, the communication terminal 10 can promptly establish the wireless communication channel. Incidentally, the encryption key is periodically updated on the wireless access point 20 side, and when the update is conducted, the sound is emitted according to the sound signal on which the establishment information including the updated encryption key is superimposed. On the other hand, since the communication terminal 10 acquires the establishment information including the expiration time information, once the wireless communication channel is established, processing related to the extraction of the establishment information in Step S5 stops until the expiration time of validity represented by the expiration time information arrives. This is because since the wireless communication channel is established by the establishment information previously used by the communication terminal 10 until the expiration data arrives, even if the establishment information is not newly extracted, the previous wireless communication channel is maintained until the expiration time of validity arrives. With the omission of the extraction in the processing of Step S5, a low power consumption in the communication terminal 10 is realized as compared with a case in which the extraction is not omitted. Also, during that period, the control unit 11 may stop the microphone 14 from picking up the sound even if the connection application program 161 is being executed.

Also, the reason that the encryption key is periodically updated by the wireless access point 20 is because after the communication terminal 10 acquires the establishment information within the range in which the sound from the speaker 24 arrives, for example, the communication terminal 10 goes out of the store, and the connection service of the wireless communication system 1 is prevented from being used. That is, unless the communication terminal 10 falls within the communicable area, since the wireless communication channel is not maintained, that at least a part of the establishment information is thus changed with time also contributes to a control of the area in which the connection service is provided. It is needless to say that the periodic update of the encryption key also contributes to the prevention of an unauthorized access by decrypting the encryption key.

The wireless access point 20 periodically transmits information necessary for establishment of the wireless communication channel such as a channel or a frequency used for the wireless communication to the communication terminal 10, which is transmitted by the control unit 21 with the help of the wireless communication unit 22.

According to the first embodiment described above, the wireless access point 20 superimposes the establishment information necessary for establishment of the wireless communication channel with the own device on the sound signal, and distributes the establishment information. That is, since the establishment information is distributed to only the area in which the sound corresponding to the sound signal arrives, if sound is insulated by using, for example, a wall or a partition, the communicable area can be relatively easily restricted in the area in which the electric wave used for the wireless communication arrives, with the use of an area restriction unit (that is, a member having the effect of sound insulation such as the wall or the partition) which is a unit visible by the human. For example, when the sound signal is used as the BGM reproduced within the store, the communicable area is used within the store. If the sound wave emitted from the speaker 24 is blocked according to the sound signal by closing a gateway of the store, the establishment information is stopped from being leaked to the external. Thus, according to the wireless communication system 1, even if the range in which the electric wave for conducting the wireless communication with the wireless access point arrives is not controlled, the area in which the wireless communication is allowed can be narrowly restricted. Further, according to the wireless communication system 1, the range in which the sound on which the establishment information is superimposed arrives can be controlled by volume control. Also, since the relatively high frequency band on which the establishment information is superimposed is relatively large in attenuation corresponding to a distance, the communicable area can be narrowed according to the wireless communication system 1. Also, dark noise is high outdoor, and for that reason, a possibility that the connection service is used in error by a user who is present outside of the store can be suppressed. Further, since the sound wave is reflected or diffracted by a wall surface from the viewpoint of the nature of the sound wave, the wireless access point 20 can distribute the establishment information, as occasion demands, even to a place that is not overlooked directly from a position of the speaker 24 which is a position from which the establishment information is issued. That is, since there is no need to precisely adjust a direction of the microphone of the communication terminal 10 for the purpose of acquiring the establishment information, a time and effort of the adjustment imposed on the user are also suppressed.

Second Embodiment

Subsequently, a second embodiment of the present invention will be described.

In the above-mentioned first embodiment, the wireless access point 20 emits sound according to the sound signal on which the establishment information is superimposed. That is, the communication terminal 10 acquires the establishment information necessary for establishment of the wireless communication channel with the wireless access point 20 from the sound signal. Instead, the communication terminal 10 may not acquire the establishment information directly from the sound signal. In this embodiment, the wireless access point 20 superimposes information (hereinafter called "substitute information") which is a substitute of the establishment information on the sound signal, instead of the establishment information per se, as information defining the establishment information. The communication terminal 10 generates the establishment information on the basis of the substitute information extracted from the sound signal. Thus, in this embodiment, the establishment information used in the wireless communication system 1 is defined by the basic substitute information of the establishment information and a generation algorithm of the establishment information in the communication terminal 10.

Hereinafter, this embodiment will be described in detail. In this embodiment, constituent elements denoted by the same symbols as those in the above-mentioned first embodiment basically function in the same way as those in the above-mentioned first embodiment, and therefore differences will be mainly described below. Hardware configurations of the respective devices in the wireless communication system 1 are identical with those in the above-mentioned first embodiment, and their description will be omitted. The contents of the algorithm described in the connection application program 161 are different from those in the above-mentioned first embodiment. Also, in the wireless access point 20, instead of the establishment information generation program 251, a generation program for generating the substitute information is stored in the storage unit 25.

Figure 8:
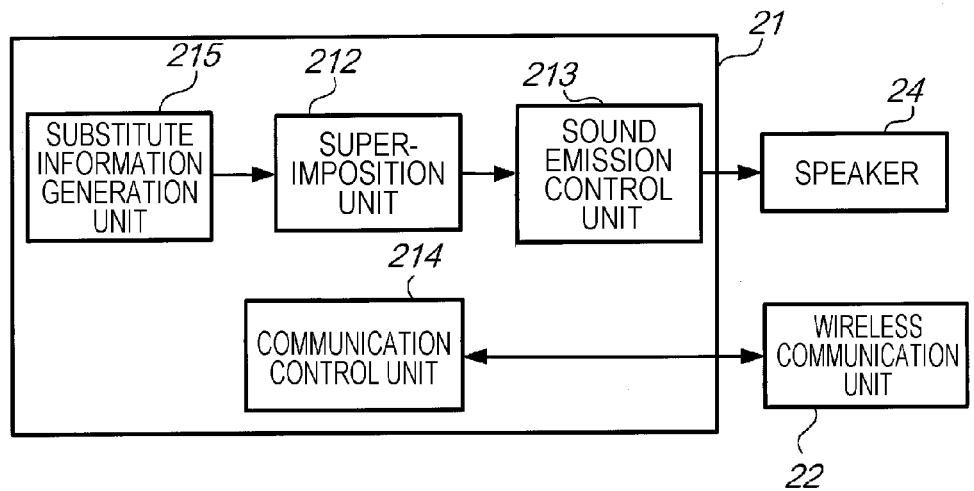
FIG. 8 is a functional block diagram illustrating a functional configuration of a control unit of a wireless access point.

FIG. 8 is a functional block diagram illustrating a functional configuration of the control unit 21 of the wireless access point 20. As illustrated in FIG. 8, the control unit 21 executes a variety of programs including the generation program to realize functions corresponding to a substitute information generation unit 215, the superimposition unit 212, the sound emission control unit 213, and the communication control unit 214.

The substitute information generation unit 215 generates the substitute information of the establishment information according to the algorithm described in the generation program. In this example, the substitute information corresponds to the establishment information used in the wireless communication system 1 on a one-to-one basis, and is represented by a bit string expressed by using a value "0" or "1". For example, when the establishment information is expressed by a pseudorandom number generated according to a given pseudorandom number generation algorithm, the substitute information can be set to a seed value used for generation of the pseudorandom number (that is, a default for generating the pseudorandom number). Also, the substitute information may be information obtained by converting (for example, encrypting) the establishment information according to a set rule. The substitute information according to this embodiment may be any information so far as the establishment information can be developed by the communication terminal 10. In this example, it is assumed that the amount of information (that is, the number of bits) of the substitute information generated by the substitute information generation unit 215 is smaller than the amount of information of the establishment information. It is not essential for the substitute information generation unit 215 to generate the substitute information on the basis of the establishment information, but the substitute information generation unit 215 may resultantly realize a function of obtaining the substitute information.

The superimposition unit 212 superimposes the substitute information generated by the substitute information generation unit 215 on the sound signal. The superimposition of the substitute information can be realized by using the technique of audio watermarking as in the above-mentioned first embodiment. The sound emission control unit 213 outputs to the speaker 24 the sound signal on which the substitute information is superimposed by the superimposition unit 212, and allows the speaker 24 to emit the sound according to the sound signal. The communication control unit 214 establishes the wireless communication channel between the communication terminal 10 and the wireless access point 20, with the use of the establishment information acquired from the communication terminal 10 by the wireless communication unit 22, which is the establishment information defined by the substitute information extracted by the communication terminal 10 from the sound signal expressing the sound wave which is emitted as the substitute information from the speaker 24 under the control of the sound emission control unit 213.

Figure 9:
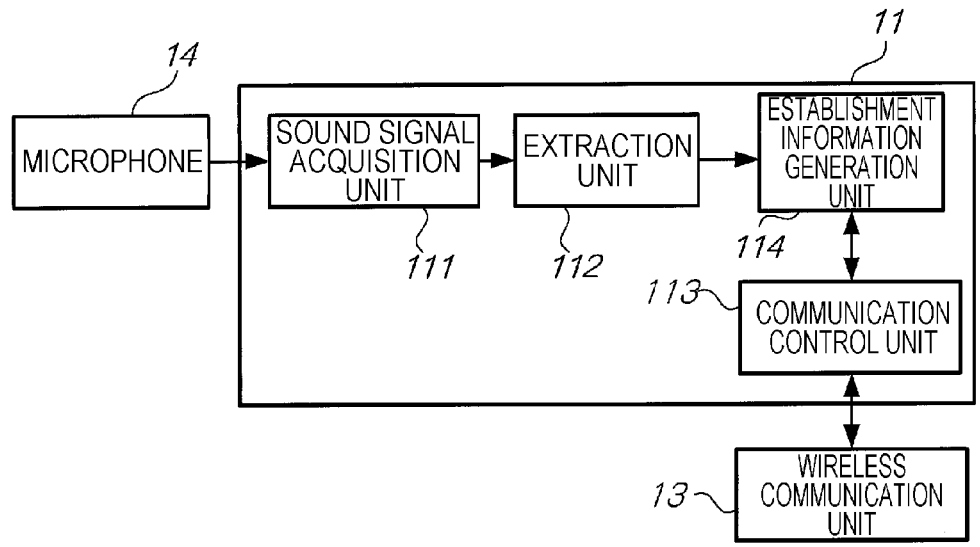
FIG. 9 is a functional block diagram illustrating a functional configuration of a control unit of a communication terminal.

FIG. 9 is a functional block diagram illustrating a functional configuration of the control unit 11 of the communication terminal 10. As illustrated in FIG. 9, the control unit 11 executes the connection application program 161 to realize functions corresponding to the sound signal acquisition unit 111, the extraction unit 112, an establishment information generation unit 114, and the communication control unit 113.

The sound signal acquisition unit 111 acquires the sound signal representing the sound wave detected by the microphone 14. The sound signal acquisition unit 111 can acquire the sound signal including a frequency component of the substitute information. The extraction unit 112 extracts the substitute information from the sound signal acquired by the sound signal acquisition unit 111. The extraction of the substitute information by the extraction unit 112 can be realized by the same technique as that in the above-mentioned first embodiment.

The establishment information generation unit 114 performs predetermined processing on the substitute information extracted by the extraction unit 112 to generate the establishment information. For example, if the seed value used for generation of the pseudorandom number is the substitute information, the establishment information generation unit 114 generates the establishment information expressed by the pseudorandom number according to a given pseudorandom number generation algorithm with the use of the seed value. Also, if the substitute information is information obtained by converting (for example, encrypting) the establishment information according to a set rule, the establishment information generation unit 114 performs conversion processing on the substitute information (for example, decryption processing) according to this rule to generate the establishment information.

In order that the establishment information generation unit 114 can generate the establishment information on the basis of the substitute information, in the wireless communication system 1, a correspondence relationship between the substitute information and the establishment information is predetermined, and the predetermined correspondence relationship is reflected on the connection application program 161 or the algorithm of the generation program. The establishment information generation unit 114 that realizes the above function is an example of a generation unit of the present invention.

Figure 10:
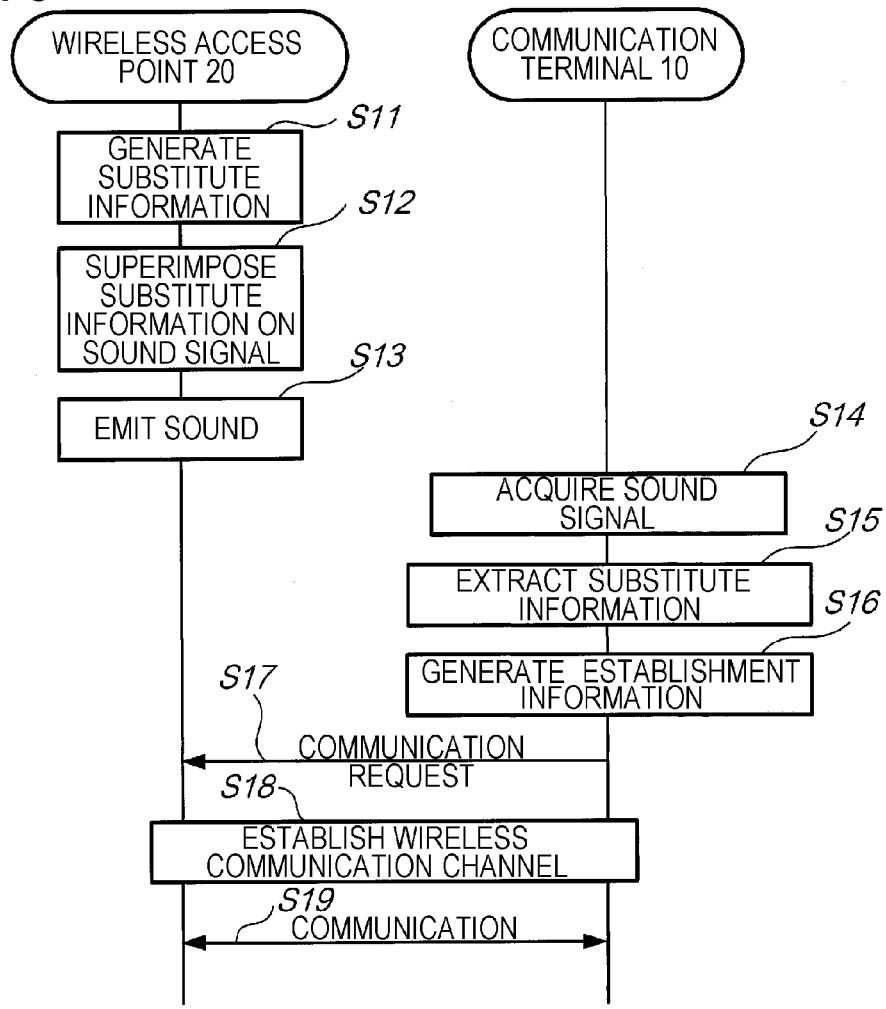
FIG. 10 is a sequence chart illustrating a flow of processing in the wireless communication system.

FIG. 10 is a sequence chart illustrating a flow of processing in the wireless communication system 1.

The control unit 21 of the wireless access point 20 executes the generation program to generate the substitute information (Step S11). Then, the control unit 21 superimposes the substitute information on the sound signal read from the storage unit 25 (Step S12). Then, the control unit 21 outputs the sound signal on which the substitute information is superimposed to the speaker 24, and emits the sound signal from the speaker 24 as the sound wave according to the sound signal (Step S13).

The control unit 11 of the communication terminal 10 acquires the sound signal representing the sound wave detected by the microphone 14 during the execution of the connection application program 161 (Step S14). Then, the control unit 11 extracts the substitute information from the acquired sound signal (Step S15). Then, the control unit 11 performs predetermined processing on the extracted substitute information to generate the establishment information (Step S16). Then, the control unit 11 transmits the communication request including the encryption key and the SSID included in the generated establishment information to the wireless access point 20 by the wireless communication unit 13 (Step S17).

Hereafter, in the same way as the processing of Steps S7 and S8 in the above-mentioned first embodiment, the wireless communication channel is established between the communication terminal 10 and the wireless access point 20 (Step S18), and the communication terminal 10 and the wireless access point 20 conduct a wireless communication with each other through the wireless communication channel established in the processing of Step S18 (Step S19).

In the wireless communication system 1 according the second embodiment described above, the establishment information is not superimposed on the sound signal as it is, but the basic substitute information of the establishment information generated in the communication terminal 10 is superimposed on the sound signal. Since the communication terminal 10 generates the establishment information on the basis of the substitute information, the wireless communication channel is established between the communication terminal 10 and the wireless access point 20 on the basis of the establishment information, as in the above-mentioned first embodiment. Also, in the wireless communication system 1 according to this embodiment, the amount of information of the substitute information is smaller than the amount of information of the establishment information. As a result, in the wireless communication system 1 according to this embodiment, it is possible to superimpose the information necessary in the frequency band narrower than that in the configuration of the first embodiment on the sound signal. In other words, even when a transmission rate of information with the use of the sound signal is low, the wireless access point 20 can distribute the substitute information for allowing the communication terminal 10 to acquire the establishment information. In this regard, a time required for the communication terminal 10 to detect the sound wave emitted according to the sound signal, and to extract the information from the sound signal representing the detected sound wave can be made shorter than that in the above-mentioned first embodiment. Further, the establishment information per se is not propagated through the space region through which the sound wave corresponding to the sound signal is propagated. Therefore, even if the substitute information is illegally extracted from the sound signal by a third party, the establishment information per se is not acquired immediately. As a result, in the wireless communication system 1, the communication terminal 10 of the valid user is more surely allowed to conduct the wireless communication with the wireless access point 20.

Third Embodiment

Subsequently, a third embodiment of the present invention will be described. In the above-mentioned second embodiment, the wireless access point 20 superimposes the basic substitute information of the establishment information generated by the communication terminal 10 on the sound signal, as the information that defines the establishment information. However, the substitute information may be other information. In this embodiment, the communication terminal 10 contacts an external service device (provider server 50 to be described later) with the use of the substitute information extracted from the sound signal, and acquires the establishment information corresponding to the substitute information from the server device. Thus, in this embodiment, the establishment information acquired by the communication terminal 10 is defined by the substitute information and the server device.

Hereinafter, this embodiment will be described in detail. In this embodiment, constituent elements denoted by the same symbols as those in the above-mentioned first embodiment basically function in the same way as those in the above-mentioned first embodiment, and therefore differences will be mainly described below. Hardware configurations of the respective devices in a wireless communication system 1a are identical with those in the above-mentioned first embodiment, and their description will be omitted. The contents of the algorithm described in the connection application program 161 are different from those in the above-mentioned first embodiment. Also, in the wireless access point 20, instead of the establishment information generation program 251, a generation program for generating the substitute information is stored in the storage unit 25.

Figure 11:
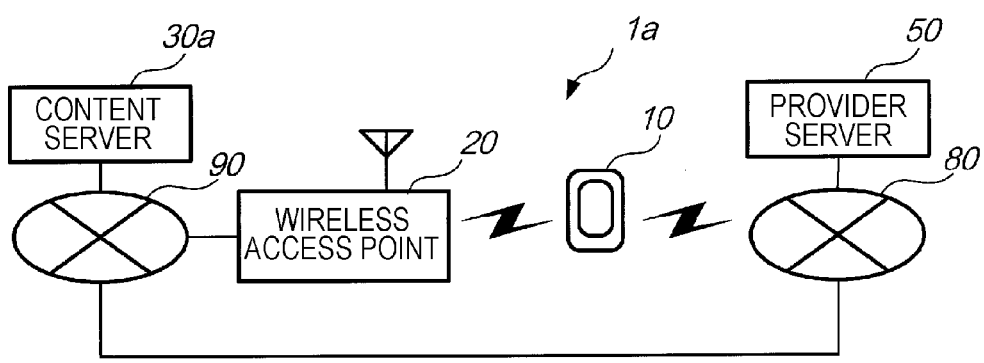
FIG. 11 is a diagram illustrating an outline configuration of a wireless communication system.

FIG. 11 is a diagram illustrating an outline configuration of the wireless communication system 1a according to this embodiment.

The wireless communication system 1a includes the communication terminal 10, the wireless access point 20, a content server 30a, and the provider server 50. The content server 30a is a server device which is identical with the server device 30 of the above-mentioned first embodiment. However, in this embodiment, for convenience of description, the server device is called "content server 30a". The communication terminal 10, the wireless access point 20, and the content server 30a have the same connection relationship as that in the above-mentioned first embodiment. The provider server 50 is a server device that is connected to the communication terminal 10 through a wireless communication network 80. The provider server 50 provides the establishment information to the communication terminal 10 according to a request from the communication terminal 10. The wireless communication network 80 is a 3G line in this example, which is a wireless communication network of a system called "3G ($3^{rd}$ generation) conforming to IMT-2000 (International Mobile Telecommunication 2000). In order to communicate with the provider server 50, the communication terminal 10 according to this embodiment has a function of conducting the wireless communication in conformity to the communication standards of IMT-2000 system. For that reason, the wireless communication unit 13 of the communication terminal 10 includes an interface for connection to the communication network 90 as well as an interface for connection to the wireless communication network 80.

The communication network 90 and the wireless communication network 80 are communication networks different from each other, but connected with gateway devices not shown. In the wireless communication system 1a, the wireless access point 20 and the provider server 50 can communicate with each other through the communication network 90 and the wireless communication network 80.

FIG. 12 is a block diagram illustrating a configuration of the provider server 50. As illustrated in FIG. 12, the provider server 50 includes a control unit 51, a network communication unit 52, and a storage unit 53.

The control unit 51 is a control device having an arithmetic device including a CPU, and a memory. The arithmetic device executes a program stored in the memory to control the provider server 50. The network communication unit 52 is an interface for connection to the wireless communication network 80, which corresponds to a network communication unit of the present invention. The storage unit 53 includes, for example, a hard disk, and stores a program for operating the control unit 51, and an establishment information management table 531 describing the establishment information that can be provided to the communication terminal 10 therein. It is assumed that one establishment information management table 531 in this example is prepared in correspondence with one wireless access point 20, and is used for each wireless access point 20.

FIG. 13 is a diagram illustrating a configuration of the establishment information management table 531.

As illustrated in FIG. 13, the establishment information management table 531 is of a structure in which the respective information such as "management number" and "establishment information" are associated with each other, and plural pairs of those data is described. The management number is a number assigned for distinguishing the respective establishment information managed by the provider server 50 from each other, and one management number is assigned to one establishment information. The management number described in the establishment information management table 531 matches the management number that is superimposed on the sound signal by the wireless access point 20. The establishment information is information equivalent to that in the above-mentioned respective embodiments. In the establishment information management table 531 illustrated in FIG. 13, the establishment information "est001" to "est005" are associated with the management Nos. "No. 001" to "No. 005", respectively.

The wireless access point 20 distributes the management number corresponding to one available establishment information. If a transmission request for the establishment information is sent from the communication terminal 10, the establishment information associated with the management number designated by the transmission request is specified from the establishment information management table 531, and provided to the communication terminal 10. Hence, the provider server 50 can provide the available establishment information to the communication terminal 10 at that time. Thus, the management number associated with the establishment information in the establishment information management table 531 corresponds to the substitute information of the present invention.

Similarly, in this embodiment, it is assumed that the amount of information on the management number is smaller than the amount of information on the establishment information. This is because of the same reasons as those in the above-mentioned second embodiment.

FIG. 14 is a functional block diagram illustrating a functional configuration of the control unit 51 of the provider server 50. As illustrated in FIG. 14, the control unit 51 executes a program to realize functions corresponding to a request acquisition unit 511, an establishment information specification unit 512, and a provision unit 513.

The request acquisition unit 511 acquires the transmission request that designates the management number, which is received from the communication terminal 10 by the network communication unit 52, and extracted by the communication terminal 10. The management number is substitute information extracted from the sound signal by the extraction unit 112.

The establishment information specification unit 512, specifies the establishment information responsive to the transmission request acquired by the request acquisition unit 511. Specifically, the establishment information specification unit 512, specifies the establishment information stored in the establishment information management table 531 in association with the management number designated by the transmission request The provision unit 513 transmits the establishment information specified by the establishment information specification unit 512 through the network communication unit 52, and provides the establishment information to the communication terminal 10. That is, the provision unit 513 is an example of a provision unit of the present invention.

Figure 15:
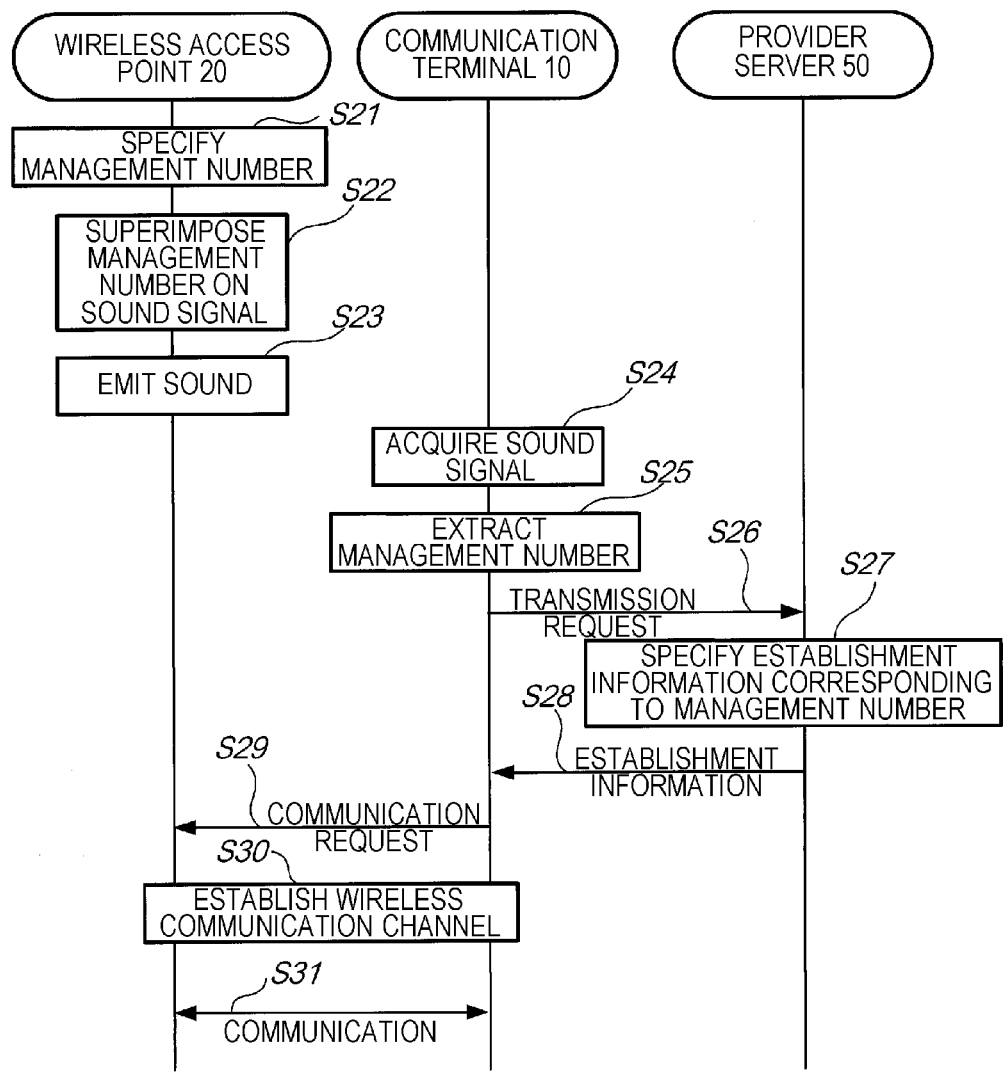
FIG. 15 is a sequence chart illustrating a flow of processing in the wireless communication system.

FIG. 15 is a sequence chart illustrating a flow of processing in the wireless communication system 1a.

The control unit 21 of the wireless access point 20 specifies the management number corresponding to available establishment information at this time (Step S21). In this example, the control unit 21 of the wireless access point 20 requests the provider server 50 to notify the management number which is a substitute of the available establishment information, by the storage unit 53. It is assumed that this request designates the available establishment information at this time. When a notification of the management number is requested, the control unit 51 of the provider server 50 specifies the management number associated with the establishment information designated by the request with reference to the establishment information management table 531, and transmits the specific management number to the wireless access point 20 by the network communication unit 52. The control unit 21 specifies the management number received and acquired from the wireless access point 20 by the processing of Step S21.

Subsequently, the control unit 21 superimposes the management number specified in the processing of Step S21 on the sound signal (Step S22). Then, the control unit 21 outputs the sound signal on which the management number is superimposed to the speaker 24, and emits the sound from the speaker 24 as the sound wave according to the sound signal (Step S23).

The control unit 11 of the communication terminal 10 acquires the sound signal representing the sound wave picked up and detected by the microphone 14 during execution of the connection application program 161 (Step S24). Then, the control unit 11 extracts the management number from the acquired sound signal (Step S25). Then, the control unit 11 transmits the transmission request for the establishment information designating the management number extracted in the processing of Step S25 to the provider server 50 by the wireless communication unit 13 (Step S26).

Upon receiving and acquiring the transmission request for the establishment information by the network communication unit 52, the control unit 51 of the provider server 50 specifies the establishment information corresponding to the management number designated by the transmission request on the basis of the establishment information management table 531 of the storage unit 53 (Step S27). When it is assumed that the control unit 51 acquires the transmission request designating the management number "No. 001", the control unit 51 specifies the establishment information "est001". The control unit 51 transmits the specified establishment information to the communication terminal 10 by the network communication unit 52 (Step S28).

When the control unit 11 of the communication terminal 10 receives and acquires the establishment information by the wireless communication unit 13, the wireless communication channel is established between the communication terminal 10 and the wireless access point 20 in the same processing as that of Steps S6 and S7 in the above-mentioned first embodiment (Steps S29, S30), and the communication terminal 10 and the wireless access point 20 conduct the wireless communication with each other through the wireless communication channel established in the processing of Step S30 (Step S31).

In the third embodiment described above, the wireless access point 20 superimposes the management number corresponding to the available establishment information on the sound signal. The provider server 50 manages the establishment information by the establishment information management table 531, and provides the available establishment information to the communication terminal 10 by the wireless access point 20 according to a request from the communication terminal 10. The communication terminal 10 acquires the establishment information from the provider server 50 on the basis of the extracted management number, and subsequently, as in the above-mentioned first and second embodiments, the wireless communication channel is established between the communication terminal 10 and the wireless access point 20 on the basis of the establishment information. Also, in the wireless communication system 1a, since the establishment information is managed by the provider server 50, a management such as update of its contents is also relatively easily conducted. Also, since the establishment information per se is not propagated through the space region through which the sound wave corresponding to the sound signal is propagated, the communication terminal 10 of the valid user is more surely allowed to conduct the wireless communication with the wireless access point 20 for the same reason as that in the above-mentioned second embodiment.

In this embodiment, one management number corresponds to the establishment information including three kinds of information such as the SSID, the encryption key, and the expiration time information. Alternatively, one management number may correspond to each partial information (one or two kinds of information) of the establishment information.

Modified Example of Third Embodiment

The configuration of the above-mentioned third embodiment may be modified to configurations described in the following (1) to (5). Also, the modified examples described below may be appropriately combined with each other.

(1) In the above-mentioned third embodiment, the provider server 50 stores the establishment information management table 531 for each wireless access point 20 one by one. However, this configuration may be modified as follows.

Figure 16:
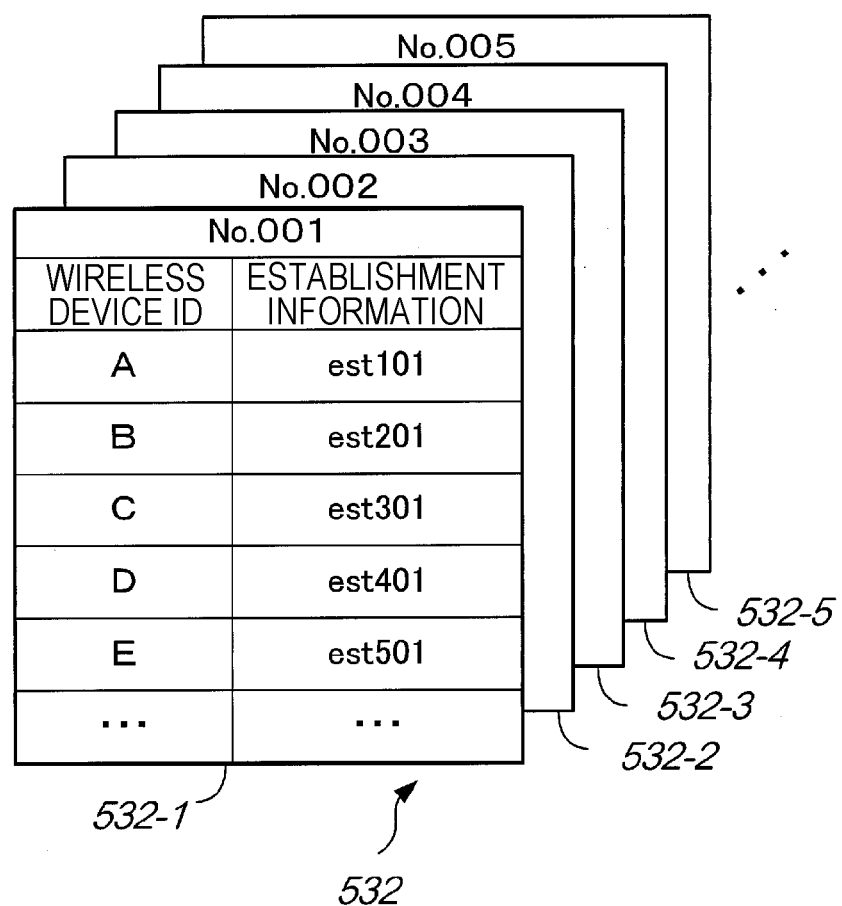
FIG. 16 is a diagram illustrating a configuration of an establishment information management table group.

FIG. 16 is a diagram illustrating a structure of an establishment information management table group 532 which is stored by the provider server 50 of the modified example instead of the establishment information management table 531. The establishment information management table group 532 has a plurality of establishment information management tables 532-$i$ corresponding to the management Nos. A sign "$i$" is a value assigned to each of the management Nos. on a one-to-one basis. FIG. 16 illustrates an establishment information management table 532-1 corresponding to the management number "No. 001", as one example. Establishment information management tables 532-2 to 532-5 corresponding to the management Nos. "No. 002" to "No. 005" are also of the same structure as that of the establishment information management table group 532-1.

As illustrated in FIG. 16, in the establishment information management table group 532-1, the wireless device ID that identifies the wireless access point 20 is associated with the establishment information. In this example, five wireless devices ID of "A" to "E" are illustrated. The wireless device ID is, for example, a MAC (media access control address) address assigned to the wireless access point 20. In this case, the provider server 50 describes the MAC address acquired the MAC address acquired by the communication with the wireless access point 20 in the establishment information management table group 532 in advance. The establishment information is information equivalent to that in the above-mentioned third embodiment.

For example, when the provider server 50 selects the management number "No. 001", the wireless access point 20 superimposes the management number "No. 001" on the sound signal, and emits the sound. The communication terminal 10 transmits the transmission request for the management number and the establishment information that designates the wireless device ID of the wireless access point 20 which is a source of the management number to the provider server 50. When the provider server 50 acquires the transmission request for the establishment information from the communication terminal 10, the provider server 50 specifies the establishment information associated with the wireless device ID of the wireless access point 20 which is a source of the management number in the communication terminal 10 from the establishment information management table group 532-1. The provider server 50 provides the establishment information from the specified establishment information management table group 532-1. For example, if the provider server 50 selects the management number "No. 001", the provider server 50 provides the establishment information "est101" when receiving the transmission request that designates the wireless device ID "A" and the management number "No. 001", and the provider server 50 provides the establishment information "est201" when receiving the transmission request that designates the wireless device ID "B" and the management number "No. 001". Even if another wireless device ID or another management number is designated by the transmission request, the provider server 50 provides the establishment information in conformity to the same rule.

In the wireless communication system 1$a$, when any one management number is selected, the provider server 50 provides the establishment information on the basis of the establishment information management table group 532-$i$ corresponding to the management number. Hence, in the wireless communication system 1$a$, the available establishment information is concurrently changed in a plurality of the wireless access points 20.

The operation in this modified example is basically identical with that in the above-mentioned third embodiment, and differences therefrom will be described.

In the wireless communication system 1$a$, the provider server 50 increments i by "1", for example, every time a set period is elapsed, or changes a value of "$i$" at random with the use of a random number, to thereby select the establishment information management table group 532-$i$ to be used. A flow of the processing in the wireless communication system 1$a$ after the provider server 50 selects the establishment information management table group 532-$i$ is identical with that in the above-mentioned third embodiment, and the available establishment information is specified on the basis of the establishment information management table group 532-$i$ to be selected. Even with the above configuration, since the establishment information associated with the management number distributed by the wireless access point 20 by the establishment information management table group 532 and the establishment information provided by the provider server 50 are synchronized with each other, the same advantageous effects as those in the above-mentioned third embodiment are obtained.

The wireless device ID may be a communication address other than the MAC address, or may be information other than the communication address if the information can be acquired from the wireless access point 20 before the communication terminal 10 establishes the communication channel. Also, the provider server 50 may acquire the wireless device ID from the wireless access point 20, and describe the wireless device ID in the establishment information management table 532 group, or the provider server 50 may generate the wireless device ID, and provide the generated wireless device ID to the wireless access point 20. Also, the provider server 50 may describe the wireless device ID manually set by a server manager in the establishment information management table 532 group, and provide the wireless device ID to the wireless access point 20.

(2) A mechanism for synchronizing the establishment information associated to the management number distributed by the wireless access point 20 by the establishment information management table 531 with the establishment information provided by the provider server 50 is not limited to that in the above-mentioned third embodiment.

For example, the establishment information management table 531 may be shared by the wireless access point 20 and the provider server 50. That is, the wireless communication system 1$a$ is configured so that the wireless access point 20 and the provider server 50 can access to a common storage device that stores the establishment information management table 531 therein. In this case, if the wireless access point 20 distributes one management number on the basis of the establishment information management table 531, even if there is no interchange corresponding to the processing in Step S21 between the wireless access point 20 and the provider server 50, the provider server 50 can specify the establishment information corresponding to the management number from the establishment information management table 531, and provide the establishment information to the communication terminal 10.

(3) The transmission request of the establishment information transmitted to the provider server 50 by the communication terminal 10 may not designate the contents (that is, management number) of the substitute information. For example, the wireless communication system 1a may request the provider server 50 to transmit the establishment information with the use of information (for example, password) representing that the communication terminal 10 extracts the substitute information from the sound signal under a configuration where both of the communication terminal 10 and the provider server 50 can discriminate the available establishment information at this time. In this case, the provider server 50 may provide the available establishment information at this time to the communication terminal 10 with an access from the communication terminal 10 by the aid of the information that the substitute information is extracted as a trigger.

In order that both of the communication terminal 10 and the provider server 50 can discriminate the available establishment information at this time, the processing in Step S21 described in the above-mentioned third embodiment may be conducted, or the establishment information management table 531 may be shared by the wireless access point 20 and the provider server 50, which is described in the above item (2). Also, the information representing that the substitute information is extracted can be, for example, arbitrary information that is automatically generated when the communication terminal 10 extracts the substitute information as a trigger. (4) In the above-mentioned third embodiment, in the provider server 50, the plural sets of data of the management number and the establishment information are described in the establishment information management table 531. However, at least one set of data may be described. When only one set of data is present, the provider server 50 provides the same establishment information at any time.

(5) Also, the functions realized by the content server 30a and the provider server 50 may be realized by one server device.

Modified Example

The present invention can be implemented by configurations different in the above embodiments. Also, modified examples described below may be appropriately combined with each other.

Modified Example 1

In the above-mentioned respective embodiments, the wireless access point 20 distributes the information that defines the establishment information in a configuration where the sound is emitted from the speaker 24. Alternatively, the present invention may be modified as follows.

Figure 17:
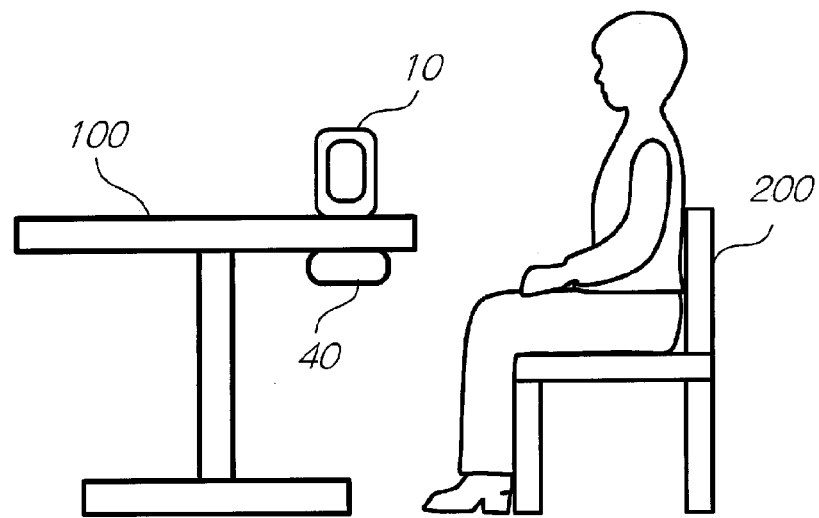
FIG. 17 is a diagram illustrating an outline of a configuration of a modified example 1.

FIG. 17 is a diagram illustrating an outline of a configuration of this modified example.

As illustrated in FIG. 17, a case in which the communicable area is configured by a restaurant such as a fast food restaurant will be described. In the restaurant, plural sets of tables 100 and chairs 200 illustrated in FIG. 17 are arranged. A user of the communication terminal 10 which is a guest of the restaurant may sit on the chair 200, place an order on the table 100, and use the communication terminal 10. In this restaurant, one sound exciter 40 is disturbed to each of the tables 100 at the time of ordering goods. The user installs the distributed sound exciter 40 on the table 100 to be used by the user. As illustrated in FIG. 17, the user installs the sound exciter 40, for example, on a rear surface of the table 100 at a position relatively close to the user. The sound exciter 40 excites a member incorporating the sound exciter 40 by vibration under the control of the wireless access point 20, and emits, from this member, the sound wave according to the sound signal including the information that defines the establishment information. In this example, the member is the table 100 on which the sound exciter 40 is installed, and the member (table 100) and the sound exciter 40 come in contact with each other, and vibrate integrally. Accordingly, in this modified example, the table 100 and the sound exciter 40 configure a sound emission unit.

Figure 18:
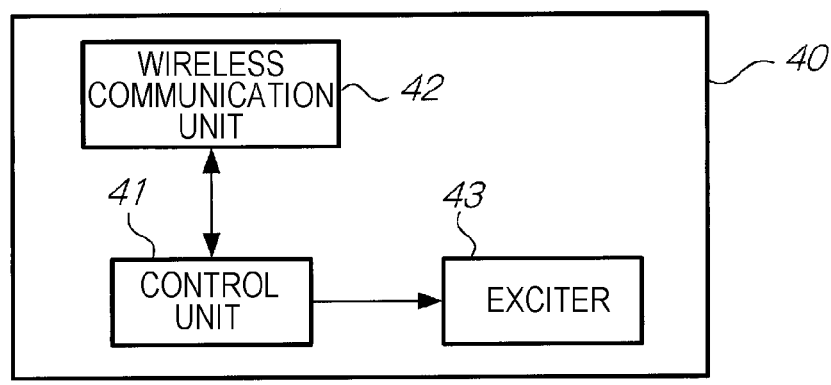
FIG. 18 is a block diagram illustrating a configuration of a sound exciter in the modified example 1.

FIG. 18 is a block diagram illustrating a configuration of the sound exciter 40.

As illustrated in FIG. 18, the sound exciter 40 includes a control unit 41, a wireless communication unit 42, and an exciter 43. The control unit 41 is a control device having an arithmetic device including a CPU and a memory. The arithmetic device executes a program stored in the memory to control the sound exciter 40. The wireless communication unit 42 is an interface including a wireless communication circuit and an antenna, and conducting the wireless communication with the wireless access point 20. The exciter 43 generates vibration according to a control signal from the control unit 41, and exerts the generated vibration on the external.

In this modified example, the wireless access point 20 controls the sound exciter 40 so as to excite the table 100 according to the sound signal from the table 100. Specifically, the sound emission control unit 213 modifies the sound signal on which the information defining the establishment information is superimposed by a carrier wave, and transmits the transmission signal by the wireless communication unit 22. Upon receiving the transmission signal by the wireless communication unit 42, the control unit 41 of the sound exciter 40 demodulates the sound signal on which the information defining the establishment information is superimposed. Then, the control unit 41 excites the exciter 43 so that the sound represented by the modulated sound signal is emitted from the table 100. The user who sits on the chair 200 holds his communication terminal 10 in the vicinity of the table 100, or places the communication terminal 10 on the table 100. Therefore, the control unit 11 acquires the sound signal representing the sound that is emitted from the table 100, and picked up by the microphone 14. Hence, the communication terminal 10 can conduct the wireless communication with the wireless access point 20.

In this modified example, the wireless access point 20 transmits the information defining the establishment information to the sound exciter 40 by the wireless communication unit 22, to thereby control the sound exciter 40. As a result, the speaker 24 for emitting the sound wave according to the sound signal may not be provided.

According to the configuration of this modified example, the communicable area in which the information defining the establishment information is distributed is limited to, for example, the vicinity of the table 100. That is, only the user who is present in the vicinity of the table 100 can use the wireless communication system 1, and the wireless communication service can be provided to only a person using the table 100, that is, a person who orders the goods. As a result, since the connection service can be also prevented from being provided to the user who merely enters the store, a range of the communicable area can be further restricted, and this modified example is also preferable when this service is provided as part of the business operation of the store such as sales of the goods.

Modified Example 2

In the configuration of the above-mentioned modified example 1, in a state where the sound exciter is installed on the table 100, the sound exciter may start excitation at the time when the user sits on the chair 200.

Figure 19:
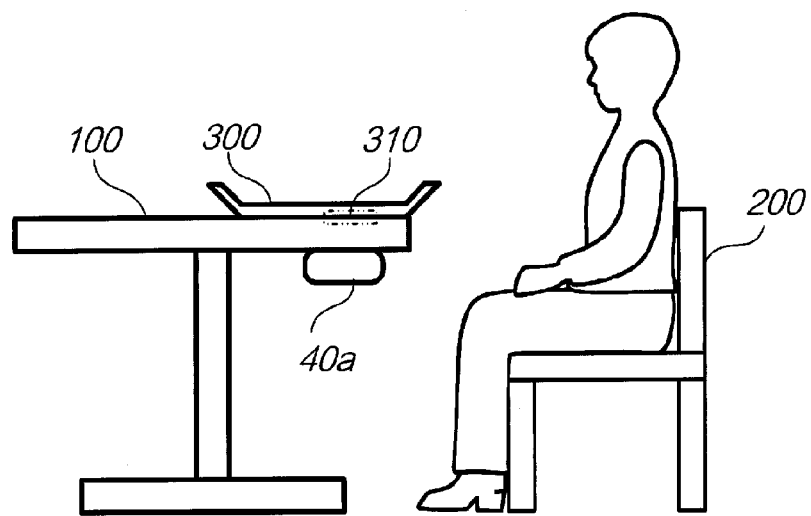
FIG. 19 is a diagram illustrating an outline of a configuration of a modified example 2.

FIG. 19 is a diagram illustrating an outline of a configuration of this modified example. In this modified example, it is assumed that the user puts the goods the user has ordered and received on a tray 300, carries the goods to his seat, and eats and drinks the goods. In this example, as shown in FIG. 19, the tray 300 is provided with an RFID (radio frequency identification) element 310. Information for identifying that the RFID element 310 is disposed on the tray 300 is written in the RFID element 310 in advance.

Figure 20:
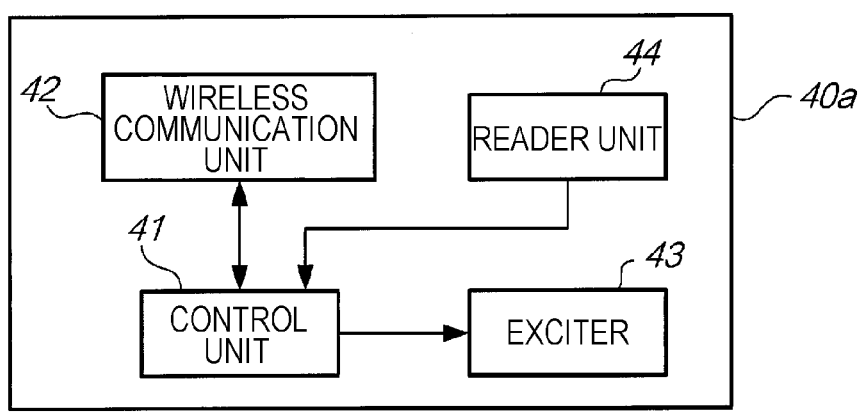
FIG. 20 is a block diagram illustrating a configuration of a sound exciter in the modified example 2.

FIG. 20 is a block diagram illustrating a configuration of a sound exciter 40a.

As illustrated in FIG. 20, the sound exciter 40a includes the control unit 41, the wireless communication unit 42, the exciter 43, and a reader unit 44. Among those components, the control unit 41, the configurations of the wireless communication unit 42, and the exciter 43 are identical with those in the modified example 1. The reader unit 44 is a so-called "RFID reader", and reads the information written in the RFID element 310.

In the sound exciter 40a, when the tray 300 is not present in the vicinity of the sound exciter 40a such that nobody seats on the chair 200, the reader unit 44 attempts to read the information of the RFID element 310 in a state where the wireless communication unit 42 stops. Eventually, the user puts the tray 300 on the table 100, and the reader unit 44 reads the information of the RFID element 310 of the tray 300. Then, the reader unit 44 outputs a read signal representing that the information has been read to the control unit 41. At the time of receiving the read signal, because the user starts the use of the table 100, and the excitation of the sound exciter 40a installed on the table 100 is enabled, the control unit 41 notifies the wireless access point 20 that the excitation of the sound exciter 40a starts through the wireless communication unit 42. At the time of receiving this notification by the wireless communication unit 22, the control unit 21 of the wireless access point 20 controls the sound exciter 40a to excite the table 100 according to the sound signal on which the information defining the establishment information is superimposed. The contents of the control may be identical with that in the above modified example 1. Also, the wireless access point 20 may not provide the speaker 24 for emitting the sound wave according to the sound signal.

Eventually, when the user with the tray 300 is left from the seat, the RFID element 310 is not read by the reader unit 44 to stop supplying the read signal. Therefore, with this operation as a trigger, the control unit 41 determines that the user does not sit on the chair 200. Then, the control unit 41 allows the wireless communication unit 42 to stop the wireless communication, and prevents the reader unit 44 from reading under the control.

With the above configuration, the wireless access point 20 can distribute the information defining the establishment information only as occasion demands without on/off operation of the sound exciter 40a by the user. As a result, when there is no need to distribute the information defining the establishment information such that the user sits at the table 100, but the tray 300 on which the ordered goods are put is not placed on the table 100, the sound exciter 40a does not need to excite the table 100. As a result, a low power consumption of the sound exciter 40a can be expected. Also, a possibility that a person who does not use the tray 300, that is, a person who does not order the goods, and is not subject to the supply of service uses this service can be further reduced, and the range of the communicable area can be further restricted.

In this modified example, the on/off operation of the acoustic excitation of the sound exciter 40a is switched with the use of the RFID element 310 and the reader unit 44. Alternatively, for example, the on/off operation may be realized by an infrared communication system, a communication system using an IC chip of a contact type or a noncontact type, or a near field communication system. Also, a configuration in which the user manually switches the on/off operation of the acoustic excitation of the sound exciter 40a may be applied. Also, in this modified example, the sound exciter 40a may be distributed to the person who orders the goods. Also, in this modified example, the RFID element 310 is disposed on the tray 300, but may be disposed on another portable member.

Modified Example 3

In the above-mentioned respective embodiments, the detection unit that detects the sound wave is the microphone 14, and the sound emission unit that emits the sound wave according to the sound signal on which the information defining the establishment information is superimposed is the speaker 24. In this case, the microphone 14 detects the sound wave which is the vibration of gas (more specifically, air), and the speaker 24 emits the sound wave which is the vibration of gas (more specifically, air). On the contrary, the detection unit/sound emission unit of this modified example may detect and emit the vibration of solid or liquid. In this case, the sound emission unit may be realized by a vibrator that supplies the vibration to the external, and a medium that is vibrated by the vibrator. That is, the vibrator propagates an elastic wave to the member to emit the sound wave. On the other hand, the detection unit is, for example, a vibration pickup (vibration detector), and detects the sound wave which is the elastic wave that propagates through the member. In this configuration, the sound signal acquisition unit 111 acquires the sound signal representing the sound wave detected by the detection unit.

Even with the configuration of such detection unit and sound emission unit, if the sound signal includes a frequency component of the information defining the establishment information, the communication terminal 10 can extracts the information defining the establishment information from the sound signal, and establish the wireless communication channel with the use of the information defining the establishment information. With the application of the configurations of the modified examples 1 and 2, the sound exciter gives the vibration that is the sound wave represented by the sound signal to a solid member. Then, the communication terminal that has the vibration detector and contacts with the table 100 detects direct vibration, and acquires the sound signal representing the direct vibration.

As described above, the sound wave of the present invention may be propagated through any one of gas, solid, and liquid. Also, the sound wave of the present invention may have not only an audible frequency range, but also a frequency range that is out of the audible frequency range (specifically, frequency range having a frequency component only in an ultrasonic wave or an infrasonic frequency, which cannot be perceived by a person. For example, the sound wave on which the information defining the establishment information is superimposed in the present invention may have only a frequency component corresponding to the information defining the establishment information.

Modified Example 4

In the above respective embodiments, all of the information defining the establishment information is superimposed on the sound signal. Alternatively, a part of the information may be acquired by the user through another route. For example, there is a case in which a service provider is to provide a service to not a large indefinite number of users, but only users who have been registered as a member in advance. In this case, the user accesses to a given web page with the use of the communication terminal 10, and acquires an ID assigned to him in advance. The ID corresponds to an identifier for identifying the communication terminal 10 or the user. When the user enters the communicable area, the user manually inputs the ID to the communication terminal 10. The control unit 11 of the communication terminal 10 stores the ID in an identifier storage unit such as the memory or the storage unit 16. On the other hand, the wireless access point 20 superimposes the information defining the information other than the ID in the establishment information on the sound signal, and allows the speaker 24 to emit the sound. The wireless access point 20 acquires the information defining the establishment information thus distributed, and the ID stored in the communication terminal 10 in advance, authenticates validities of those information, and determines whether to establish the wireless communication channel, or not. That is, the communication control unit 113 establishes the wireless communication channel with the use of the information defining the establishment information which is extracted by the extraction unit 112, and the ID acquired in a different method by the communication terminal 10.

Also, the communication terminal 10 may receive and acquire the expiration time information from the external server (for example, the provider server 50 in the above-mentioned third embodiment) by the wireless communication unit 13.

As in this modified example, the wireless access point 20 may not distribute the information defining all of the establishment information by superimposing the information on the sound signal.

Modified Example 5

In the above-mentioned first embodiment, a description is given of a configuration in which once the communication terminal 10 establishes the wireless communication channel, the processing related to the extraction of the establishment information stops until the expiration time of validity represented by the expiration time information arrives. Alternatively, the communication terminal 10 may operate as follows.

FIG. 21 is a flowchart illustrating a flow of processing of the communication terminal 10. When the control unit 11 of the communication terminal 10 starts the execution of the connection application program 161, the control unit 11 starts to acquire the sound signal representing the sound wave detected by the microphone 14 (Step S41). Then, the control unit 11 starts a process of extracting the establishment information from the acquired sound signal (Step S42). The control unit 11 attempts to extract the establishment information from the sound signal, and determines whether to extract the establishment information, or not (Step S43). The control unit 11 repeats the attempt until extracting the establishment information during the execution of the connection application program 161 (no in Step S43).

Then, if the control unit 11 determines that the establishment information is extracted (yes in Step S43), the control unit 11 stops the process of acquiring the sound signal which starts in the processing of Step S41, and the process of extracting the establishment information from the sound signal which starts in the processing of Step S42 (Step S44). Even during this stop period, the wireless communication channel established between the communication terminal 10 and the wireless access point 20 is maintained.

Then, the control unit 11 determines whether to come close to the expiration time of validity represented by the expiration time information of the establishment information which triggers the determination as "yes" in the processing of Step S43, or not (Step S45). In this example, the control unit 11 determines that it comes close to the expiration time of validity, at a predetermined period (for example, 3 minutes before) before the expiration time. The control unit 11 determines that the result is "no" in the processing of Step S45 until it comes close to the expiration time of validity, and leaves the process of acquiring the sound signal and the process of extracting the establishment information from the sound signal stopped.

Then, if the control unit 11 determines that it comes close to the expiration time of validity (yes in Step S45), the control unit 11 acquires the sound signal representing the sound wave detected by the microphone 14, and cancels the stop of extraction of the establishment information from the sound signal (Step S46). That is, the control unit 11 starts the process of acquiring the sound signal from the microphone 14, and the process of extracting the establishment information from the acquired sound signal.

Thereafter, the control unit 11 repetitively executes processing of (a) to (d) during the execution of the connection application program 161 in the stated order such that (a) acquiring the sound signal, and extracting the establishment information from the acquired sound signal, (b) stopping the process of acquiring the sound signal and the process of extracting the establishment information from the sound signal, (c) determining whether to come close to the expiration time of validity, or not, and (d) canceling stop of the process of acquiring the sound signal when coming close to the expiration time of validity and the process of extracting the establishment information from the sound signal. According to this configuration, the low power consumption in the communication terminal 10 is realized as compared with a case of continuously conducting the process of acquiring the sound signal, and the process of extracting the establishment information from the sound signal.

The control unit 11 may cancel the stop of the acquisition of the sound signal and the extraction of the establishment information from the sound signal at the timing corresponding to the expiration time information extracted from the sound signal. Therefore, the timing of the cancel may be determined so that the wireless communication channel is maintained even after the establishment information is changed.

Also, in this example, the control unit 11 stops both of the process of acquiring the sound signal and the process of extracting the establishment information from the sound signal, but may stop only the process of extracting the establishment information. Also, in this example, a case in which the communication terminal 10 extracts the establishment information from the sound signal is described as in the above-mentioned first embodiment. However, the configuration of this modified example can be also applied to a configuration in which the communication terminal 10 extracts the substitute information from the sound signal, as in the above-mentioned second and third embodiments.

Modified Example 6

In the wireless communication system according to the above-mentioned respective embodiments, only in a period where the communication terminal 10 detects a predetermined sound, the establishment of the wireless communication channel between the communication terminal 10 and the wireless access point 20 may be allowed.

In fact, if the communication terminal 10 acquires the establishment information, the communication terminal 10 may be connectable to the wireless access point 20 in a range where the electric wave arrives, even outside of the communicable area, so far as within the expiration time of validity represented by the expiration time information. Under the circumstances, a device having the sound emission function such as the wireless access point 20 may emit a determined specific sound (for example, audible sound such as a beacon sound), and the wireless communication channel may be established between the communication terminal 10 and the wireless access point 20 only in a period where the sound is detected in the communication terminal 10. In this case, the control unit 11 analyzes a sound signal of the sound picked up by the microphone 14, and maintains the wireless communication channel with the wireless access point 20 only when the sound waveform matches a set waveform. Alternatively, using other known methods, the communication terminal 10 may detect the specific sound.

According to the configuration of this modified example, unless the sound is detected in the communication terminal 10, since the wireless communication channel between the communication terminal 10 and the wireless access point 20 is cut off, unauthorized connection to the wireless access point 20 can be surely prevented.

Modified Example 7

The present invention may be intended to form the communicable area in a place other than a restaurant (that is, store that sells goods) which sells food and drink. For example, the present invention may be intended to form the communicable area in a place where a specific service is provided, with the provision of the wireless access point 20 in a platform of vehicles such as bus stops or stations. In this case, the wireless access point 20 can distribute information on a timetable, proximity, and delay of the vehicles, and information related to destinations of the vehicles only to the communication terminal 10 of the user who comes to the vicinity thereof. In addition, the wireless communication system 1 may be arranged in a place where a large indefinite number of persons come and go, such as cafes, restaurants, stations, hotels, or lobbies of offices, and the present invention is not limited to a specific place.

Also, the wireless communication system according to the present invention may be configured as with a so-called digital signage. In this case, when the communication terminal 10 enters the communicable area of the wireless access point 20, the wireless access point 20 may display the contents related to a place in which the communicable area is formed in the communication terminal 10. In this configuration, for example, the wireless device of the present invention is installed on display shelves of a store such as a supermarket, and the wireless device distributes the content including information such as the sources of goods on the display shelves to the communication terminal 10.

Also, the content distributed by the wireless access point 20 may be acquired from the server 30 by a communication, or may be acquired from a variety of recording media installed in the own device. The content to be distributed may be of any type.

In this modified example, the sound exciters 40 and 40a are used as in the configuration of the modified example 1, members excited by the sound exciters 40 and 40a may be, for example, walls configuring a variety of furniture or room spaces, and may be installed within the communicable area, and emit the sound according to the excitation.

Modified Example 8

In the above-mentioned respective embodiments, the wireless access point 20 updates the contents of the encryption key according to time, but may not be updated. In this case, the wireless access point 20 may not include the expiration time information in the establishment information. Also, the wireless access point 20 may include information other than the SSID and the encryption key in the establishment information, and may include authentication information for authenticating a communication partner such as a password or an identifier of the communication terminal 10 or the user, in the establishment information. Also, the establishment information may include information other than the encryption key which is changed in the contents according to time, and the expiration time information representing the expiration time of validity of that information. In conclusion, the establishment information is information that can identify the communication terminal allowed as the communication partner by the wireless access point 20, and essential as the conditions of establishment of the wireless communication channel. Also, the wireless communication system between the communication terminal 10 and the wireless access point 20 is not limited to a specific system in the present invention so far as the system includes a process for the establishment of the wireless communication channel.

Modified Example 9

In the above-mentioned respective embodiments, the wireless access point 20 realizes both of the function of distributing the information defining the establishment information with the sound emission corresponding to the sound signal, and the function of conducting the wireless communication. A configuration corresponding to the wireless device according to the present invention may be realized by a cooperation of a device for realizing one function with a device for realizing the other function.

Also, the wireless access point 20 may emit the sound to the speaker device connected wirelessly according to the sound signal, except for the configuration in which the sound is emitted to the speaker 24 connected by wiring.

Modified Example 10

In the above-mentioned respective embodiments, the configuration for superimposing the information defining the establishment information by the wireless access point 20 may be modified as follows. For example, the superimposition unit 212 may phase-modulate a carrier wave signal representing a carrier wave for carrying the sound signal on the basis of the information defining the establishment information for superimposing the information defining the establishment information. Also, the superimposition unit 212 may superimpose the information defining the establishment information on the sound signal according to an orthogonal frequency division multiplexing (OFDM).

Modified Example 11

The communication terminal according to the present invention may be a terminal other than a smart phone. For example, the present invention can be applied to a variety of communication terminals (wireless communication terminal) that can conduct the wireless communication such as a cellular phone, a PDA (personal digital assistant), a mobile computer, a game machine, or a digital signage. Also, the microphone 14 may be replaced with a microphone detachably attached to the communication terminal. In this configuration, the microphone may be connected to the communication terminal by any one of wired and wireless connections. Also, in the wireless access point 20, the speaker 24 may be replaced with a speaker detachably attached to the wireless access point.

Also, the wireless device according to the present invention is not limited to the wireless access point, but any type of the wireless device is applicable so far as the wireless device can conduct the wireless communication with the communication terminal of the present invention. Also, the types of the communication networks of the communication network 90 and the wireless communication network 80 described above are not limited to the above configurations. Also, the communication network 90 and the wireless communication network 80 may configure an integral communication network.

The programs executed by the control unit 11 of the communication terminal 10, the control unit 21 of the wireless access point 20, and the control unit 51 of the provider server 50 in the above-mentioned respective embodiments can be provided by being recorded in a magnetic recording medium (magnetic tape, magnetic disc (HDD, FDD), and the like), an optical recording medium (optical disc (CD, DVD), and the like), a magnetooptical recording medium, or a recording medium such as a semiconductor memory readable by a computer. Also, the programs can be downloaded through a network such as the Internet. The functions thus realized by the control unit 11 or the control unit 21 may be realized by one or a plurality of software, or may be realized by one or a plurality of hardware.

REFERENCE SIGNS LIST

1: wireless communication system, 10: communication terminal, 100: table; 11: control unit, 111: sound signal acquisition unit, 112: extraction unit, 113: communication control unit, 114: establishment information generation unit, 12: UI unit, 13: wireless communication unit, 14: microphone, 15 speaker, 16: storage unit, 161: connection application program, 20: wireless access point, 200: chair, 21: control unit, 211: establishment information generation unit, 212: superimposition unit, 213: sound emission control unit, 214: communication control unit, 215: substitute information generation unit, 22: wireless communication unit, 23: network communication unit, 24: speaker, 25: storage unit, 251: establishment information generation program, 30: server, 30a: content server, 300: tray, 310: RFID element, 40: 40a: sound exciter, 41: control unit, 42: wireless communication unit, 43: exciter, 44: reader unit, 50: provider server, 51: control unit, 52: network communication unit, 53: storage unit, 531: establishment information management table, 532: establishment information management table group, 80: wireless communication network, 90: communication network

The invention claimed is:

1. A communication terminal comprising:
a wireless communication unit;
an acquisition unit configured to acquire a sound signal representing a sound wave;
an extraction unit configured to extract information from the sound signal acquired by the acquisition unit, wherein the information defines establishment information used for establishing a wireless communication channel between the communication terminal and a wireless device;
a communication control unit configured to:
    transmit the establishment information that is defined by the information extracted by the extraction unit through the wireless communication to establish the wireless communication channel; and
    control the wireless communication unit to conduct a communication through the established wireless communication channel; and
a generation unit configured to perform predetermined processing on the extracted information to generate the establishment information defined by the extracted information,
wherein the communication control unit establishes the wireless communication channel with use of the establishment information generated by the generation unit, and
wherein after the communication control unit establishes the wireless communication channel with the use of the establishment information defined by the extracted information, the extraction unit:
    stops extracting the information that defines the establishment information; and
    thereafter cancels to stop extracting at a timing corresponding to an expiration time of validity of the establishment information represented by expiration time information included in the extracted information.

2. A communication terminal comprising:
a wireless communication unit;
an acquisition unit configured to acquire a sound signal representing a sound wave;
an extraction unit configured to extract information from the sound signal acquired by the acquisition unit, wherein the information defines establishment information used for establishing a wireless communication channel between the communication terminal and a wireless device; and
a communication control unit configured to:
    transmit the establishment information that is defined by the information extracted by the extraction unit through the wireless communication to establish the wireless communication channel; and
    control the wireless communication unit to conduct a communication through the established wireless communication channel,
wherein the wireless communication unit communicates with a provider server that is configured to provide the establishment information through a wireless communication network,
wherein the communication control unit requests the provider server to transmit the establishment information defined by the extracted information to the communication terminal through the wireless communication unit, and wherein, upon receiving the establishment information provided by the provider server through the wireless communication unit in response to the request, the communication control unit establishes the wireless communication channel with use of the received establishment information.

3. The communication terminal according to claim 1, wherein after the communication control unit establishes the wireless communication channel, also the acquisition unit stops acquisition of the sound signal, and thereafter cancels to stop the acquisition at the timing.

4. A wireless device comprising:
a wireless communication unit;
a superimposition unit configured to superimpose information on a sound signal, wherein the information defines establishment information used for establishing a wireless communication channel between the wireless device and a communication terminal;
a sound emission control unit configured to control a sound emission unit to emit a sound wave according to the sound signal on which the information defining the establishment information is superimposed by the superimposition unit, wherein the establishment information is defined by information extracted by the communication terminal from the sound signal representing the sound wave emitted by the sound emission unit; and
a communication control unit configured to:
establish the wireless communication channel with use of the establishment information acquired from the communication terminal through the wireless communication unit; and
control the wireless communication unit to conduct a communication through the established wireless communication channel,
wherein the sound emission unit includes a member configured to vibrate, and a sound exciter configured to excite the member, and
wherein the sound emission control unit excites the sound exciter to emit from the member the sound wave corresponding to the sound signal on which the information defining the establishment information is superimposed.

5. A provider server comprising:
a network communication unit configured to communicate through a wireless communication network with a communication terminal that includes:
a wireless communication unit;
an acquisition unit configured to acquire a sound signal representing a sound wave;
an extraction unit configured to extract information from the sound signal acquired by the acquisition unit, wherein the information defines establishment information used for establishing a wireless communication channel between the communication terminal and a wireless device; and
a communication control unit configured to:
transmit the establishment information that is defined by the information extracted by the extraction unit through the wireless communication to establish the wireless communication channel;
control the wireless communication unit to conduct a communication through the established wireless communication channel;
request the provider server to transmit the establishment information defined by the extracted information to the communication terminal through the wireless communication unit; and
upon receiving the establishment information provided by the provider server through the wireless communication unit in response to the request, establish the wireless communication channel with use of the received establishment information;
a storage unit configured to store the establishment information and the information defining the establishment information in association with each other; and
a provision unit configured to:
transmit, upon receiving the transmission request through the network communication unit, the establishment information stored in the storage unit in association with the extracted information through the network communication unit; and
provide the establishment information to the communication terminal.

6. A provider server comprising:
a network communication configured to communicate, through a wireless communication network, a transmission request for establishment information including information by a communication terminal that is configured to extract the information defining the establishment information used for establishing a wireless communication channel between the communication terminal and a wireless device, from a sound signal representing a sound wave;
a storage unit configured to store the establishment information and the information defining the establishment information in association with each other; and
a provision unit configured to:
transmit, upon receiving the transmission request through the network communication unit, the establishment information stored in the storage unit in association with the extracted information through the network communication unit; and
provide the establishment information to the communication terminal.

7. The provider server according to claim 6, wherein:
the storage unit stores plural pairs of the establishment information and the information defining the establishment information therein, and
the provision unit provides the establishment information in the storage unit, paired with the information extracted by the extraction unit, to the communication terminal.

8. A wireless communication system comprising:
a wireless device; and
a provider server,
wherein the wireless device includes:
a wireless communication unit;
a superimposition unit configured to superimpose information on a sound signal, wherein the information defines establishment information used for establishing a wireless communication channel between the wireless device and a communication terminal;
a sound emission control unit configured to control a sound emission unit to emit a sound wave according to the sound signal on which the information defining the establishment information is superimposed by the superimposition unit, wherein the establishment information is defined by information extracted by the communication terminal from the sound signal representing the sound wave emitted by the sound emission unit; and a communication control unit configured to:
- establish the wireless communication channel with use of the establishment information acquired from the communication terminal through the wireless communication unit; and
- control the wireless communication unit to conduct a communication through the established wireless communication channel, and wherein the provider server includes:
- a network communication unit configured to communicate, through a wireless communication network, a transmission request for establishment information including information by the communication terminal, which is configured to extract the information defining the establishment information used for establishing the wireless communication channel between the communication terminal and the wireless device, from the sound signal;
- a storage unit configured to store the establishment information and the information defining the establishment information in association with each other; and
- a provision unit configured to:
  - transmit, upon receiving the transmission request through the network communication unit, the establishment information stored in the storage unit in association with the extracted information through the network communication unit; and
  - provide the establishment information to the communication terminal.

9. A wireless communication system comprising:
a wireless device; and
a communication terminal,
wherein the wireless device includes:
- a first wireless communication unit;
- a superimposition unit configured to superimpose information on a sound signal, wherein the information defines establishment information used for establishing a wireless communication channel between the wireless device and the communication terminal;
- a sound emission control unit configured to control a sound emission unit to emit a sound wave according to the sound signal on which the information defining the establishment information is superimposed by the superimposition unit, wherein the establishment information is defined by information extracted by the communication terminal from the sound signal representing the sound wave emitted by the sound emission unit; and
- a communication control unit configured to:
  - establish the wireless communication channel with use of the establishment information acquired from the communication terminal through the first wireless communication unit control the first wireless communication unit to conduct a communication through the established wireless communication channel, and wherein the communication terminal includes:
- a second wireless communication unit;
- an acquisition unit configured to acquire the sound signal;
- an extraction unit configured to extract the information from the sound signal acquired by the acquisition unit, wherein the information defines establishment information used for establishing a wireless communication channel between the communication terminal and the wireless device; and
- a communication control unit configured to:
  - transmit the establishment information that is defined by the information extracted by the extraction unit through the wireless communication to establish the wireless communication channel; and
  - control the second wireless communication unit to conduct a communication through the established wireless communication channel.

10. The communication terminal according to claim 2, wherein after the communication control unit establishes the wireless communication channel with the use of the establishment information defined by the extracted information, the extraction unit stops extracting the information that defines the establishment information, and thereafter cancels to stop extracting at a timing corresponding to an expiration time of validity of the establishment information represented by expiration time information included in the extracted information.

11. The communication terminal according to claim 10, wherein after the communication control unit establishes the wireless communication channel, also the acquisition unit stops acquisition of the sound signal, and thereafter cancels to stop the acquisition at the timing.

* * * * *